(12) United States Patent
Haraguchi et al.

(10) Patent No.: US 6,850,674 B2
(45) Date of Patent: Feb. 1, 2005

(54) OPTICAL DEVICE

(75) Inventors: Akira Haraguchi, Yokohama (JP); Takeo Komiya, Yokohama (JP); Maki Ikeji, Yokohama (JP); Takashi Sasaki, Yokohama (JP); Yasushi Fujimura, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/434,368

(22) Filed: May 9, 2003

(65) Prior Publication Data

US 2004/0067025 A1 Apr. 8, 2004

(30) Foreign Application Priority Data

| May 9, 2002 | (JP) | P2002-134494 |
| May 14, 2002 | (JP) | P2002-138981 |
| Jun. 20, 2002 | (JP) | P2002-180303 |

(51) Int. Cl.[7] ............................................. G02B 6/30
(52) U.S. Cl. .......................... 385/49; 385/48; 385/129
(58) Field of Search .......................... 385/48–49, 88–89, 385/129–130

(56) References Cited

U.S. PATENT DOCUMENTS

| 5,071,213 A | * | 12/1991 | Chan ............................ 385/52 |
| 5,604,636 A | | 2/1997 | Asami et al. |
| 5,987,202 A | * | 11/1999 | Gruenwald et al. ........... 385/49 |
| 6,327,407 B1 | * | 12/2001 | Mitsuda et al. ............... 385/49 |
| 6,374,021 B1 | * | 4/2002 | Nakanishi et al. ............. 385/49 |
| 6,406,196 B1 | * | 6/2002 | Uno et al. ..................... 385/89 |
| 6,443,632 B2 | | 9/2002 | Ando et al. |
| 6,481,059 B2 | | 11/2002 | Morris |

FOREIGN PATENT DOCUMENTS

| CA | 2331577 A | 7/2001 |
| CN | 1191023 A | 8/1998 |
| CN | 1414408 A | 4/2003 |
| EP | 0 836 105 A1 | 4/1998 |
| EP | 0 844 503 A1 | 5/1998 |
| EP | 1 148 367 A1 | 10/2001 |
| JP | 2-15203 | 1/1990 |
| JP | 2001-66473 A | 6/1990 |
| JP | 4-330788 | 11/1992 |
| JP | 7-318766 A | 12/1995 |
| JP | 10-173207 A | 6/1998 |
| JP | 10-213723 | 8/1998 |
| JP | 10-268158 | 10/1998 |
| JP | 2000-171656 | 6/2000 |
| JP | 2001-203419 A | 7/2001 |
| JP | 2001-264589 | 9/2001 |
| JP | 2001-281505 | 10/2001 |
| WO | WO 97/06458 | 2/1997 |

* cited by examiner

*Primary Examiner*—Drew A. Dunn
*Assistant Examiner*—Leo Boutsikaris
(74) *Attorney, Agent, or Firm*—McDermott Will & Emery LLP

(57) ABSTRACT

An optical device 1 has a substrate 2, whereas bare fibers 5 exposed from a coated optical fiber tape 3 by removing a coating 4 from its middle part are secured to the upper face part of the substrate 2. In the substrate 2, a transverse groove 8 is formed obliquely with respect to an axis of the bare fibers 5 so as to traverse core parts 5a of the bare fibers. An optical member 9 for reflecting a part of signal light transmitted through the bare fibers 5 is inserted in the transverse groove 8. A support member 10 is provided on the upper side of the bare fibers 5, whereas a support surface 10a of the support member 10 is provided with photodetectors 11 for detecting light reflected by the optical member 9. The support surface 10a of the support member 10 is inclined with respect to the upper face of the substrate 2, whereby the light entrance surface 13 of each photodetector 11 is inclined by a predetermined angle with respect to the upper face of the substrate 2. Such a configuration realizes an optical device which can lower the polarization dependence of received light in the photodetectors.

54 Claims, 32 Drawing Sheets

OPTICAL DEVICE

BACKGROUND OF THE INVENTION

1. Field of the Invention

The present invention relates to an optical device for monitoring an optical intensity of an optical signal transmitted through an optical fiber and the like.

2. Related Background Art

Known as an optical device monitoring an optical signal transmitted through an optical fiber is one disclosed in Japanese Patent Application Laid-Open No. HEI 2-15203, for example. The optical fiber type optical demultiplexer disclosed in the above-mentioned publication comprises a substrate whose upper face has an optical fiber secured thereto. The substrate is formed with a groove which is at right angles to the fiber axis of the optical fiber and at an angle of 45° with respect to a side face of the substrate. A wavelength filter is inserted into the groove and bonded thereto. On the substrate, a photodetector is disposed so as to oppose the reflecting surface of the wavelength filter.

SUMMARY OF THE INVENTION

In the above-mentioned prior art, however, the photodetector is placed on the upper face of the substrate so as to arrange a light entrance surface substantially parallel to the optical fiber, whereby the light reflected by the filter is obliquely incident on the lower face of the photodetector. Therefore, it is difficult for the reflected light on the light entrance surface of the photodetector to have an incident angle closer to a right angle. Hence, the dependence on the polarization of received light occurring at the light entrance surface of the photodetector increases. In this case, the optical intensity of the optical signal is hard to monitor accurately.

It is an object of the present invention to provide an optical device which can reduce the polarization dependence of received light in the photodetector.

The present invention provides an optical device comprising a substrate having a bare fiber positioned and secured to an upper face part of the substrate, the bare fiber being exposed from a coated optical fiber partly stripped of a coating; a transverse groove formed obliquely with respect to an axis of the bare fiber so as to traverse at least a core part of the bare fiber; an optical member, inserted into the transverse groove, for reflecting or diffracting a part of signal light transmitted through the coated optical fiber; and a photodetector, disposed on an upper side of the substrate, for detecting the light reflected or diffracted by the optical member; the photodetector being arranged with a light entrance surface thereof tilting with respect to the upper face of the substrate.

In such an optical device comprising an optical member and a photodetector, the polarization dependence of light transmitted through the light entrance surface of the photodetector (received light polarization dependence) is mainly determined by the angle of reflection of light at the optical member and the angle of incidence of light with respect to the light entrance surface of the photodetector. As each of the angles of reflection and incidence is closer to a right angle, the received light polarization dependence is easier to lower.

If the angle of reflection of light in the optical member is made closer to a right angle when the photodetector is arranged such that its light entrance surface is parallel to the upper face of the substrate here, the angle of incidence of light with respect to the light entrance surface of the photodetector deviates farther from the right angle, thereby increasing the polarization dependence. Arranging the photodetector such that the light entrance surface of the photodetector is tilting with respect to the upper face of the substrate as mentioned above allows both the angle of reflection of light at the optical member and the angle of incidence of light on the light entrance surface of the photodetector to approach the right angle. This can reduce the received light polarization dependence in the photodetector.

Preferably, a support member supporting the photodetector is disposed on the upper side of the substrate, whereas the support member has a support surface, tilted with respect to the upper face of the substrate, on the photodetector side. As a consequence, the light entrance surface of the photodetector can be tilted with respect to the upper face of the substrate in a simple and reliable fashion when the photodetector is in a flat structure.

In another aspect, the present invention provides an optical device comprising a substrate having a bare fiber positioned and secured to an upper face part of the substrate, the bare fiber being exposed from a coated optical fiber partly stripped of a coating; a transverse groove formed obliquely with respect to an axis of the bare fiber so as to traverse at least a core part of the bare fiber; an optical member, inserted into the transverse groove, for reflecting or diffracting a part of signal light transmitted through the coated optical fiber; a photodetector, disposed on an upper side of the substrate, for detecting the light reflected or diffracted by the optical member; and optical path changing means for changing an optical path such that the light reflected or diffracted by the optical member is incident on a light entrance surface of the photodetector at a predetermined angle.

In such an optical device comprising an optical member and a photodetector, the polarization dependence of light transmitted through the light entrance surface of the photodetector (received light polarization dependence) is mainly determined by the angle of reflection of light at the optical member and the angle of incidence of light with respect to the light entrance surface of the photodetector. As each of the angles of reflection and incidence is closer to a right angle, the received light polarization dependence is easier to lower.

If the angle of reflection of light in the optical member is made closer to a right angle when the photodetector is arranged such that its light entrance surface is parallel to the upper face of the substrate here, the angle of incidence of light with respect to the light entrance surface of the photodetector deviates farther from the right angle, thereby increasing the polarization dependence. Providing the optical path changing means as mentioned above allows both the angle of reflection of light in the optical member and the angle of incidence of light on the light entrance surface of the photodetector to approach the right angle regardless of the posture of arrangement of the photodetector. This can reduce the received light polarization dependence in the photodetector. Preferably, the optical path changing means is a total reflection mirror. This can realize the optical path changing means in a simple and inexpensive configuration.

In the above-mentioned prior art, the photodetector, which is a light-receiving device, is in an exposed state, thus yielding a possibility of the photodetector deteriorating characteristics thereof depending on humidity, thereby operating unstably. The reliability of the optical device decreases in this case.

In view of such a problem, the present invention provides an optical device comprising a substrate having a bare fiber positioned and secured to an upper face part of the substrate, the bare fiber being exposed from a coated optical fiber partly stripped of a coating; a transverse groove formed obliquely with respect to an axis of the bare fiber so as to traverse at least a core part of the bare fiber; an optical member, inserted into the transverse groove, for reflecting a part of signal light transmitted through the coated optical fiber; a photodetector (light-receiving device), disposed on an upper side of the substrate, for detecting the light reflected by the optical member; and a package, secured to the coated optical fiber, for hermetically sealing the photodetector.

When the photodetector is hermetically sealed within the package as such, the photodetector can reliably be protected against the external environment. As a consequence, the photodetector is prevented from deteriorating its characteristics because of humidity. Also, the photodetector does not deteriorate its characteristics because of moisture and the like attaching to the photodetector. This stabilizes operations of the photodetector and improves its reliability. Securing the bare fiber of the coated optical fiber to the upper face of the substrate facilitates an operation of aligning the optical axis of the photodetector.

A method of making an optical device having such a configuration preferably comprises the steps of removing a coating from a part of a coated optical fiber so as to expose a bare fiber; positioning and securing the bare fiber onto an upper face part of a substrate; forming a transverse groove traversing at least a core part of the bare fiber obliquely with respect to an axis of the bare fiber; inserting into the traverse groove an optical member reflecting a part of signal light transmitted through the coated optical fiber; arranging on an upper side of the substrate a photodetector for receiving light reflected by the optical member; and securing to the coated optical fiber a package for hermetically sealing the photodetector.

The present invention provides an optical submarine cable system comprising the above optical device having a reliability of 1 Fit or less in terms of failure in time as a hermetic sealing characteristic.

In another aspect, the present invention provides an optical device comprising a substrate having a bare fiber positioned and secured to an upper face part of the substrate, the bare fiber being exposed from a coated optical fiber partly stripped of a coating; a transverse groove formed obliquely with respect to an axis of the bare fiber so as to traverse at least a core part of the bare fiber; an optical member, inserted into the transverse groove, for reflecting or diffracting a part of signal light transmitted through the coated optical fiber; a photodetector, disposed on an upper side of the substrate, for detecting the light reflected or diffracted by the optical member; and a sealing part sealing at least the photodetector with a resin.

Such a sealing part protects the photodetector against the external environment, thereby preventing the photodetector from deteriorating its optical characteristics because of humidity. Though moisture may enter the resin in the case of resin sealing, the flow of moisture in the resin can be stopped if the layer of the sealing part is made thicker, whereby the photodetector can be prevented from deteriorating its characteristics because of moisture attaching thereto. This stabilizes operations of the photodetector, thereby improving the reliability of the optical device. Forming the sealing part with a resin can inexpensively realize a structure for sealing the photodetector.

When the optical device comprising an optical member and a photodetector is constituted by an optical waveguide, it is necessary that an optical fiber be connected to the optical waveguide by an optical connector or the like. A configuration in which a bare fiber of a coated optical fiber is secured to a substrate makes it unnecessary to provide such an optical fiber connecting part, whereby the cost of parts can be cut down while restraining the optical transmission loss from increasing. Here, it will be preferred if the sealing part is formed so as to surround the substrate while incorporating the photodetector. In this case, not only the photodetector but also the substrate, the bare fiber and optical member secured onto the substrate, and the like are protected against the external environment. Therefore, the optical device further improves its reliability.

DESCRIPTION OF THE PREFERRED EMBODIMENTS

In the following, preferred embodiments of the optical device in accordance with the present invention will be explained with reference to the drawings.

Figure 1:
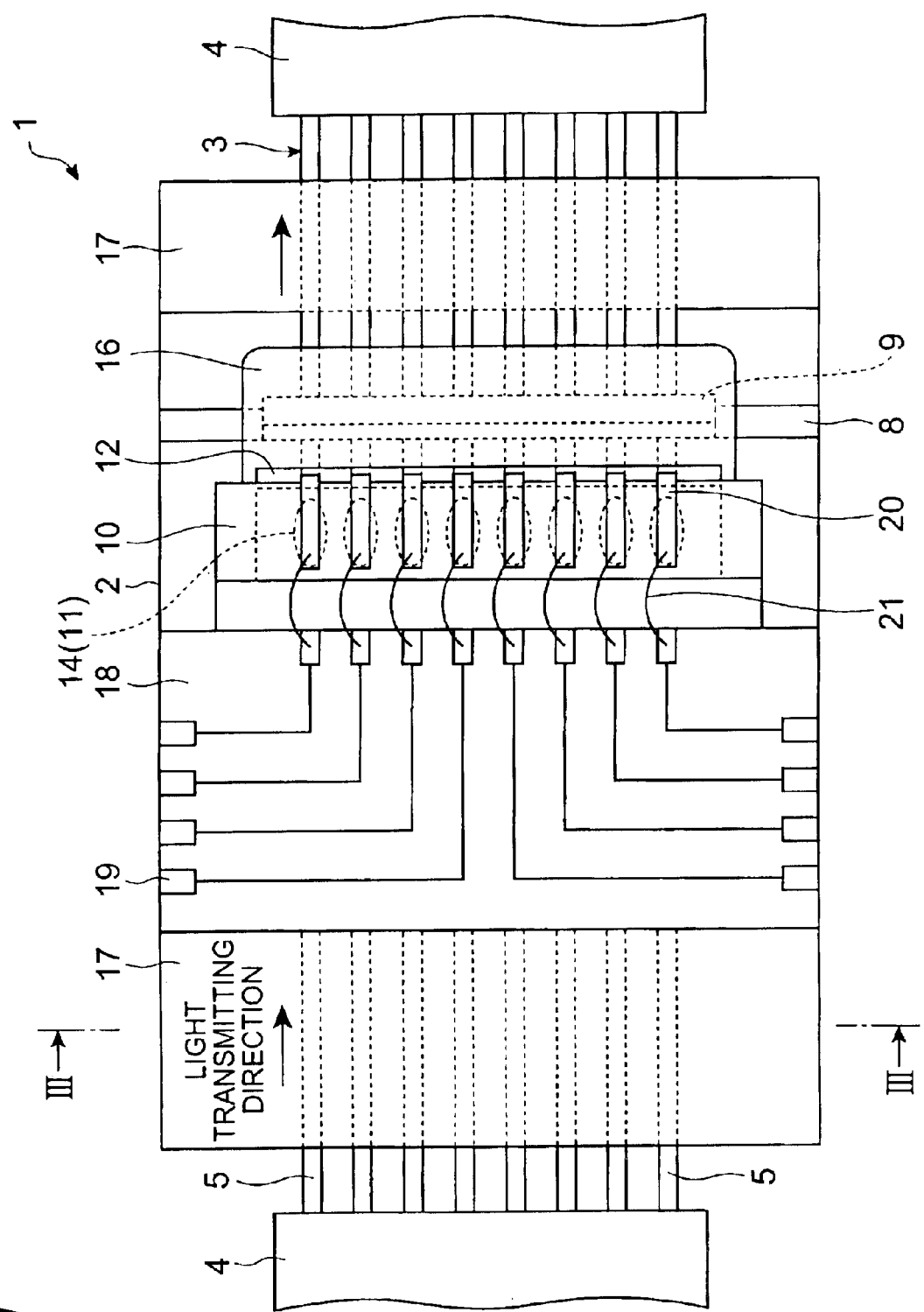
FIG. 1 is a plan view showing the optical device in accordance with a first embodiment.
Figure 2:
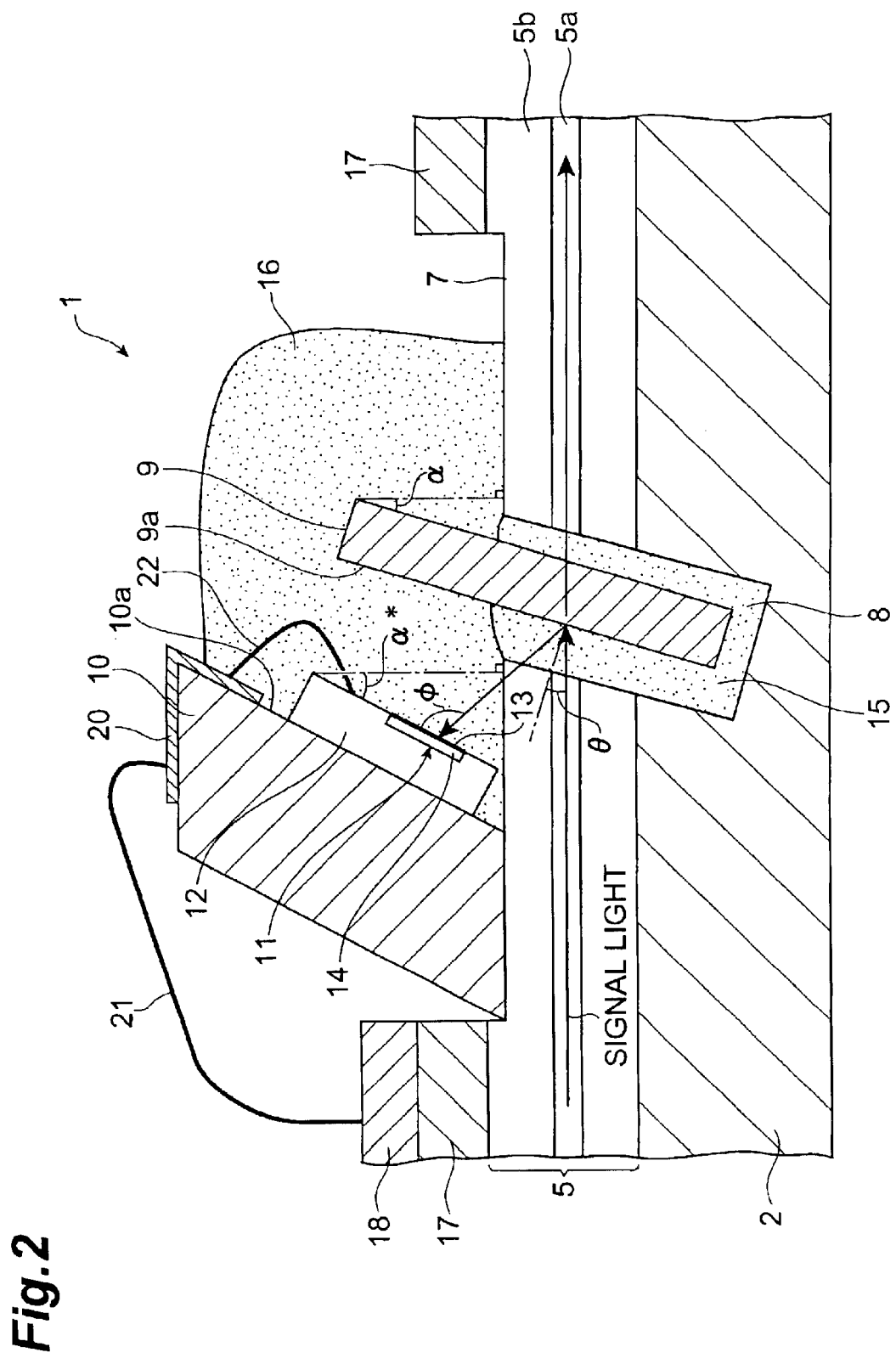
FIG. 2 is a vertical sectional view of a part of the optical device shown in FIG. 1.
Figure 3:
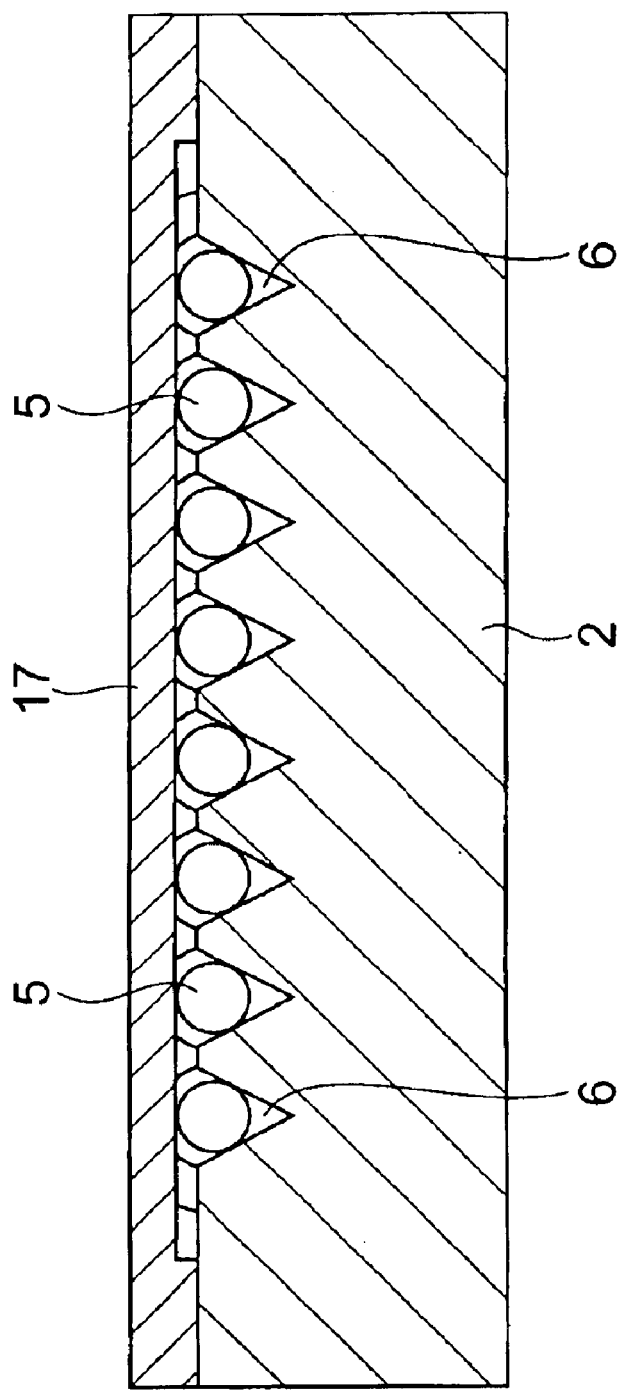
FIG. 3 is a sectional view taken along the line III—III of FIG. 1.

FIG. 1 is a plan view showing the optical device in accordance with a first embodiment of the present invention, whereas FIG. 2 is a vertical sectional view showing a part of the optical device. In FIGS. 1 and 2, the optical device 1 in accordance with this embodiment comprises a substrate 2, whereas a plurality of bare fibers 5 exposed from a multicore (eight-core here) coated optical fiber tape 3 by removing a coating 4 from its middle part are secured to an upper face part of the substrate 2. As shown in FIG. 3, the upper face of the substrate 2 is formed with a plurality of fiber-positioning V grooves 6, whereas the bare fibers 5 are secured to the substrate 2 by an adhesive or the like while in a state arranged in their respective V grooves 6.

Each bare fiber 5 is constituted by a core 5a and a cladding 5b disposed thereabout. The bare fiber 5 secured onto the substrate 2 includes a cladding-shaved part 7 formed by shaving the upper side of the cladding 5b toward the central axis of the bare fiber 5.

The substrate 2 is provided with a transverse groove 8 extending in a direction in which the bare fibers 5 are aligned. The transverse groove 8 is formed obliquely with respect to axes of the bare fibers 5 so as to divide the bare fibers 5. Inserted in the transverse groove 8 is an optical member 9 by which a part of signal light transmitted through the cores 5a of the bare fibers 5 is reflected obliquely upward at a predetermined reflectance. The optical member 9 is disposed obliquely with respect to the axis of each bare fiber 5 (the upper face of the substrate 2) in conformity to the transverse groove 8.

Disposed on the cladding-shaved parts 7 of the bare fibers 5 is a support member 10 extending in the direction in which the bare fibers 5 are aligned. Attached to a surface (support surface) 10a opposing a reflecting surface 9a of the optical member 9 in the support member 10 is a photodetector array 12 comprising a plurality of (eight here) photodetectors 11 for detecting the light reflected by the optical member 9. Each photodetector 11 is a front-entrance type photodetector having a light-receiving part 14 disposed close to a light-entrance surface 13. The light-receiving part 14 receives the light reflected by the optical member 9 and converts thus received light into an electric signal.

The support member 10 is configured such that its support surface 10a is tilted by a predetermined angle with respect to the upper face of the substrate 2. As a consequence, the light entrance surface 13 of each photodetector 11 is tilted by a predetermined angle with respect to the upper face of the substrate 2.

The transverse groove 8 is filled with a refractive index matching resin 15 for yielding a refractive index matching the core 5a of the bare fiber 5. By curing the refractive index matching resin 15, the optical member 9 is secured to the substrate 2. Provided on the upper side of the substrate 5 including the location between the optical member 9 and support member 10 is a refractive index matching resin 16 having a refractive index on a par with that of the refractive index matching resin 15. As a consequence, no surface of discontinuity occurs in terms of refractive index between each bare fiber 5 and the optical member 9 and between the optical member 9 and each photodetector 11, whereby inconveniences such as reflection and scattering of light are prevented from occurring. Here, silicone resins and the like are used as the refractive index matching resins 15, 16.

When the light reflected by the optical member 9 is transmitted through the light entrance surface 13 of each photodetector 11, polarization dependence of received light sensitivity occurs in the light entrance surface 13. This polarization dependence is mainly determined by the angle of reflection in the optical member 9, the angle of incidence of light with respect to the light entrance surface 13 of the photodetector 11, and the refractive indices of the refractive index matching resins 15, 16. Here, the refractive indices of the refractive index matching resins 15, 16 are substantially the same as the refractive index of the core 5a of each bare fiber 5, and thus are less influential on the polarization dependence. Therefore, in order to improve the polarization dependence of the photodetector 11, it is necessary that the angle of reflection of light in the optical member 9 and the angle of incidence of light with respect to the light entrance surface 13 of the photodetector 11 be optimized.

Letting $\alpha$ be the angle of inclination of the optical member 9 with respect to a plane orthogonal to the upper face of the substrate 2, the angle of reflection $\theta$ of light in the optical member 9 becomes $\alpha$. The received light polarization dependence of the photodetector 11 decreases as the angle of reflection $\theta$ is smaller (closer to a right angle with respect to the reflecting surface 9a of the optical member 9). Therefore, the angle of inclination $\alpha$ of the optical member 9 preferably falls within the range of $0° < \alpha \leq 30°$.

Preferably, the angle of inclination $\alpha^*$ of the light entrance surface 13 of each photodetector 11 with respect to a plane orthogonal to the upper face of the substrate 2 is set such that the angle of incidence $\phi$ of light with respect to the light entrance surface 13 is 70 to 110 degrees. Specifically, when the light reflected by the optical member 9 is perpendicularly incident on the light entrance surface 13 of the photodetector 11 (the angle of incidence $\phi$ is 90 degrees), the angle of inclination $\alpha^*$ of the light entrance surface 13 is $2\alpha$.

Therefore, it will be sufficient if the angle of inclination $\alpha^*$ of the light entrance surface 13 falls within the range of $(2\alpha-20)°<\alpha^*<(2\alpha+20)°$.

When the angle of inclination a of the optical member 9 and the angle of inclination $\alpha^*$ of the light entrance surface 13 of the photodetector 11 are individually set as such, the polarization dependence of light transmitted through the light entrance surface 13 can be lowered.

Here, the angle of incidence φ of reflected light with respect to the light entrance surface 13 is preferably 90 to 110 degrees, 96 to 110 degrees in particular. In this case, scattered light is prevented from being reflected a plurality of times by the reflecting surface 9a of the optical member 9 and the light entrance surface 13 of the photodetector 11, whereby the polarization dependence of light transmitted through the light entrance surface 13 can further be lowered.

The light-receiving surface of the photodetector 11 has a substantially elliptical form with a longer axis extending along the axis of each bare fiber 5 and a shorter axis extending along a direction in which the bare fibers 5 are aligned (see FIG. 1). Though the signal light transmitted through each bare fiber 5 has a substantially circular light spot due to the form of the core 5a, the signal light is reflected by the optical member 9 arranged obliquely with respect to the upper face of the substrate 2 so as to reach the light-receiving part 14 of the photodetector 11. Therefore, an elliptical light spot having a longer axis extending along the axis of each bare fiber 5 and a shorter axis extending along a direction in which the bare fibers 5 are aligned is formed on the light-receiving surface of the photodetector 11. Here, the ratio between the longer axis and shorter axis (longer axis/shorter axis) of the light spot is $1/(\cos\theta^* \cos(90°-\phi))$ within the range where the angle of incidence φ with respect to the light entrance surface 13 is 70 to 110 degrees.

Therefore, it is preferred if the light-receiving surface of the photodetector 11 has a substantially elliptical form slightly larger than the elliptical light spot formed on the light-receiving surface. This increases the light-receiving efficiency in the photodetector 11, thereby suppressing the occurrence of noise from the light-receiving surface and the like. The photodetector 11 is made smaller than a rectangle whose two sides are formed by the longer axis and shorter axis, whereby the response speed is kept from decreasing, and the dark current is prevented from increasing. Also, since the photodetectors 11 can be arranged with a smaller pitch in the photodetector array 12, the optical device itself can be made smaller. Further, the receiving of scattered light can be minimized while increasing the light-receiving sensitivity at the light-receiving surface, whereby crosstalk can be suppressed between adjacent photodetectors 11.

In this embodiment, the upper cladding part of each bare fiber 5 is shaved so as to form the cladding-shaved part 7, and the photodetector 11 is disposed on the upper side of the cladding-shaved part 7, whereby the distance between the reflecting surface 9a of the optical member 9 and the light entrance surface 13 of the photodetector 11 can be shortened. This also contributes to suppressing the crosstalk between the adjacent photodetectors 11.

On the substrate 2, the upper cladding part of the bare fibers 5 is shaved flat at the location formed with the transverse groove 8 and at the location where the photodetectors 11 are placed, so as to constitute the cladding-shaved part 7. At the location excluding the cladding-shaved part 7 in the upper face part of the substrate 2, a lid 17 covering the bare fibers 5 is disposed. This can minimize damages to the bare fibers 5.

Mounted on the upper face of the lid 17 on the rear side of the support member 10 (the side opposite from the photodetector array 12) is a submount board 18. The submount board 18 is provided with a plurality of wiring patterns 19 corresponding to the respective photodetectors 11. The upper side of the support member 10 is provided with a plurality of wiring patterns 20 corresponding to the respective photodetectors 11. The wiring pattern 19 and 20 are electrically connected to each other by wires 21, whereas the wiring patterns 20 and their corresponding light-receiving parts 14 of the photodetectors 11 are electrically connected to each other by wires 22.

In thus configured optical device 1, the signal light transmitted through each optical fiber is transmitted through the refractive index matching resin 15 and optical member 9 within the transverse groove 8, so as to be made incident on its corresponding bare fiber 5 and further transmitted therethrough. Here, a part of the signal light is reflected by the optical member 9 so as to be directed to the obliquely upper side of the upper face of the substrate 2. Thus reflected light reaches the photodetector 11 by way of the refractive index matching resin 16. The optical intensity of reflected light is detected by the light-receiving part 14 of the photodetector 11, and is sent as an electric signal to an external device (not depicted).

Here, as mentioned above, the polarization dependence of light transmitted through the light entrance surface 13 of each photodetector 11 decreases, and the cross talk between the photodetectors 11 is suppressed, whereby the optical intensity of reflected light can accurately be monitored. This improves the reliability of the optical device 1.

Figure 4:
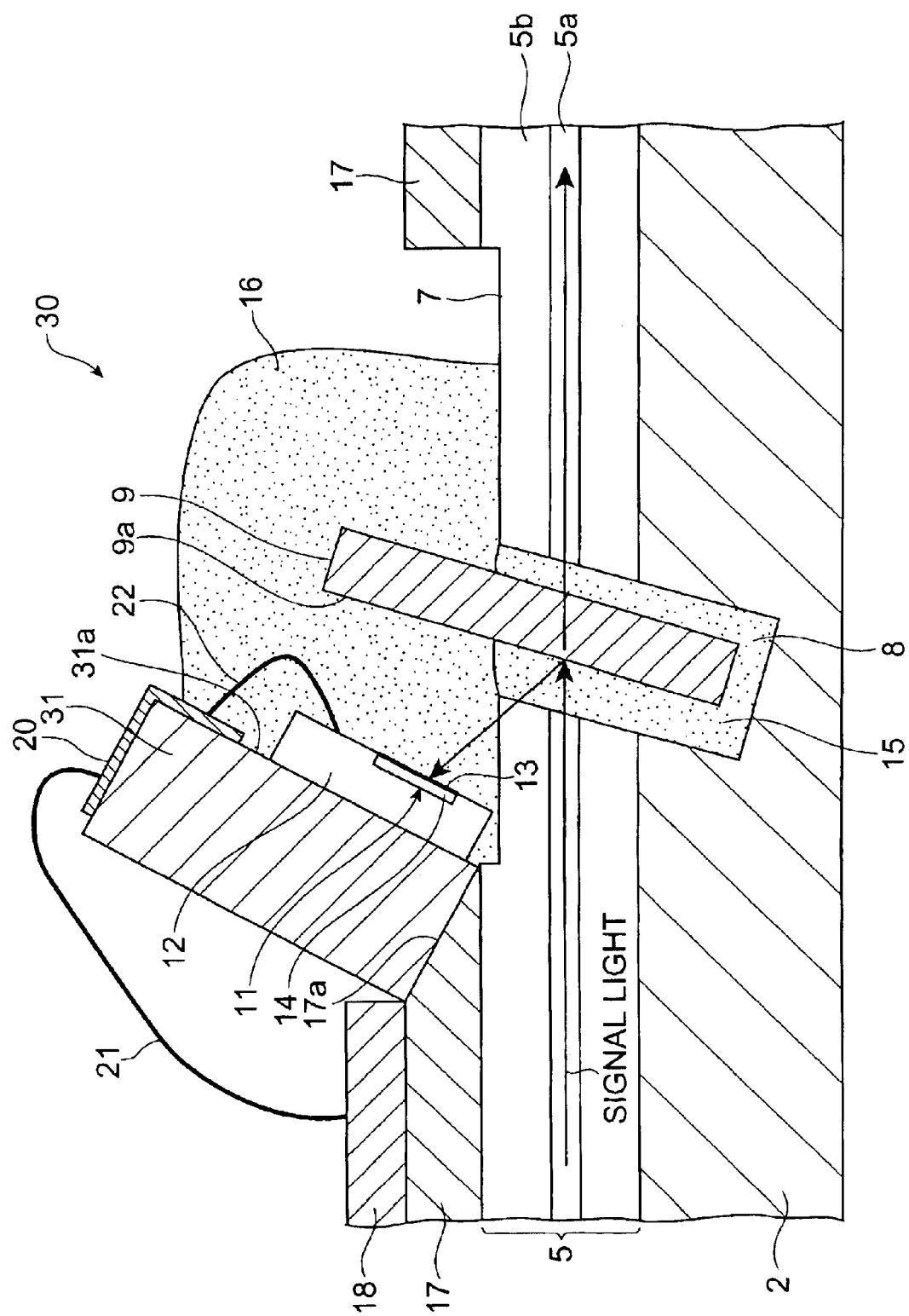
FIG. 4 is a vertical sectional view showing a part of the optical device in accordance with a second embodiment.

FIG. 4 is a vertical sectional view showing a part of the optical device in accordance with a second embodiment of the present invention. In FIG. 4, members identical or equivalent to those in the first embodiment will be referred to with numerals identical thereto without repeating their explanations.

In FIG. 4, the optical device 30 in accordance with the second embodiment has a lid 17 covering bare fibers 5, whereas the lid 17 is provided with a tilted surface 17a inclined with respect to the upper face of a substrate 2. A support member 31 having a rectangular parallelepiped form is mounted on the tilted surface 17a. A photodetector array 12 having a plurality of photodetectors 11 is attached to one side face (support surface) 31a of the support member 31. As a consequence, the light entrance surface 13 of each photodetector 11 tilts by a desirable angle with respect to the upper face of the substrate 2.

Such an optical device 30 uses the rectangular parallel piped support member 31 having a simple structure, and thus is advantageous in terms of manufacturing. Since such a support member 31 is not disposed on the bare fibers 5 but on the lid 17, the bare fibers 5 are hardly damaged upon attaching the photodetectors 11, whereby the increase of loss in the bare fibers 5 can be reduced.

Without being restricted to the above-mentioned rectangular parallelepiped form, the support member 31 may have any form such as cubic form, as long as it can be made easily.

Figure 5:
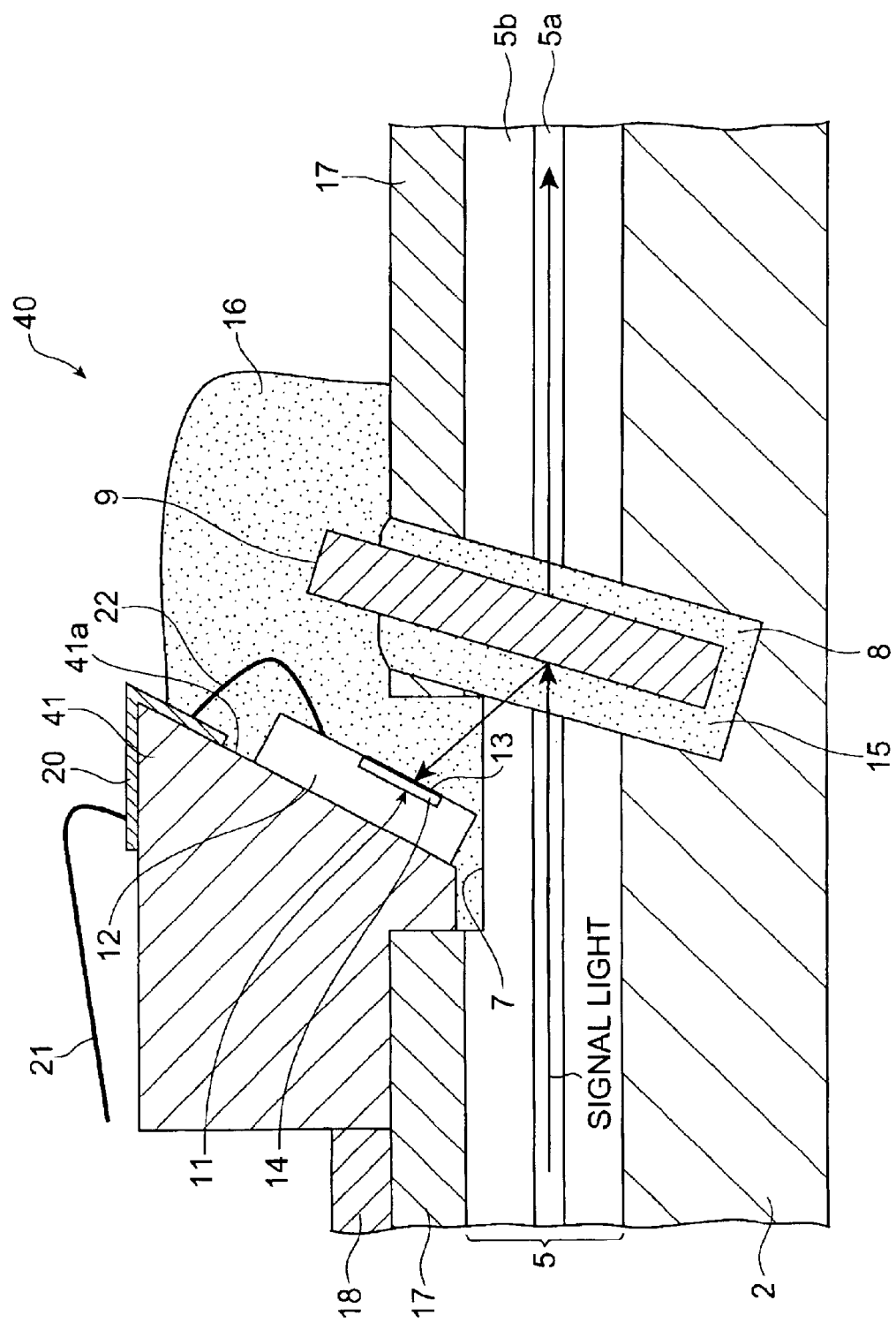
FIG. 5 is a vertical sectional view showing a part of the optical device in accordance with a third embodiment.

FIG. 5 is a vertical sectional view showing a part of the optical device in accordance with a third embodiment of the present invention. In FIG. 5, members identical or equivalent to those in the first embodiment will be referred to with numerals identical thereto without repeating their explanations.

In FIG. 5, the optical device 40 in accordance with the third embodiment has a cladding-shaved part 7 formed by shaving the upper part of claddings 5b of bare fibers 5. The cladding-shaved part 7 is formed only on the photodetector 11 side of an optical member 9. On the upper face part of the substrate 2, a lid 17 covering the bare fibers 5 is disposed at the location excluding the cladding-shaved part 7. A transverse groove 8 in which the optical member 9 is inserted is formed so as to extend from the upper face of the lid 17 toward the lower side of the substrate 2. A support member 41 is secured to the lid 17. The support member 41 has a support surface 41a tilted by a desirable angle with respect to the upper face of the substrate 2, whereas a photodetector array 12 having a plurality of photodetectors 11 is attached to the support surface 41a.

Since the length of the cladding-shaved part 7 in the bare fibers 5 is minimized while the support member 41 is not secured onto the bare fibers 5 but onto the lid 17 as such, this configuration is advantageous in preventing the bare fibers 5 from being damaged.

Figure 6:
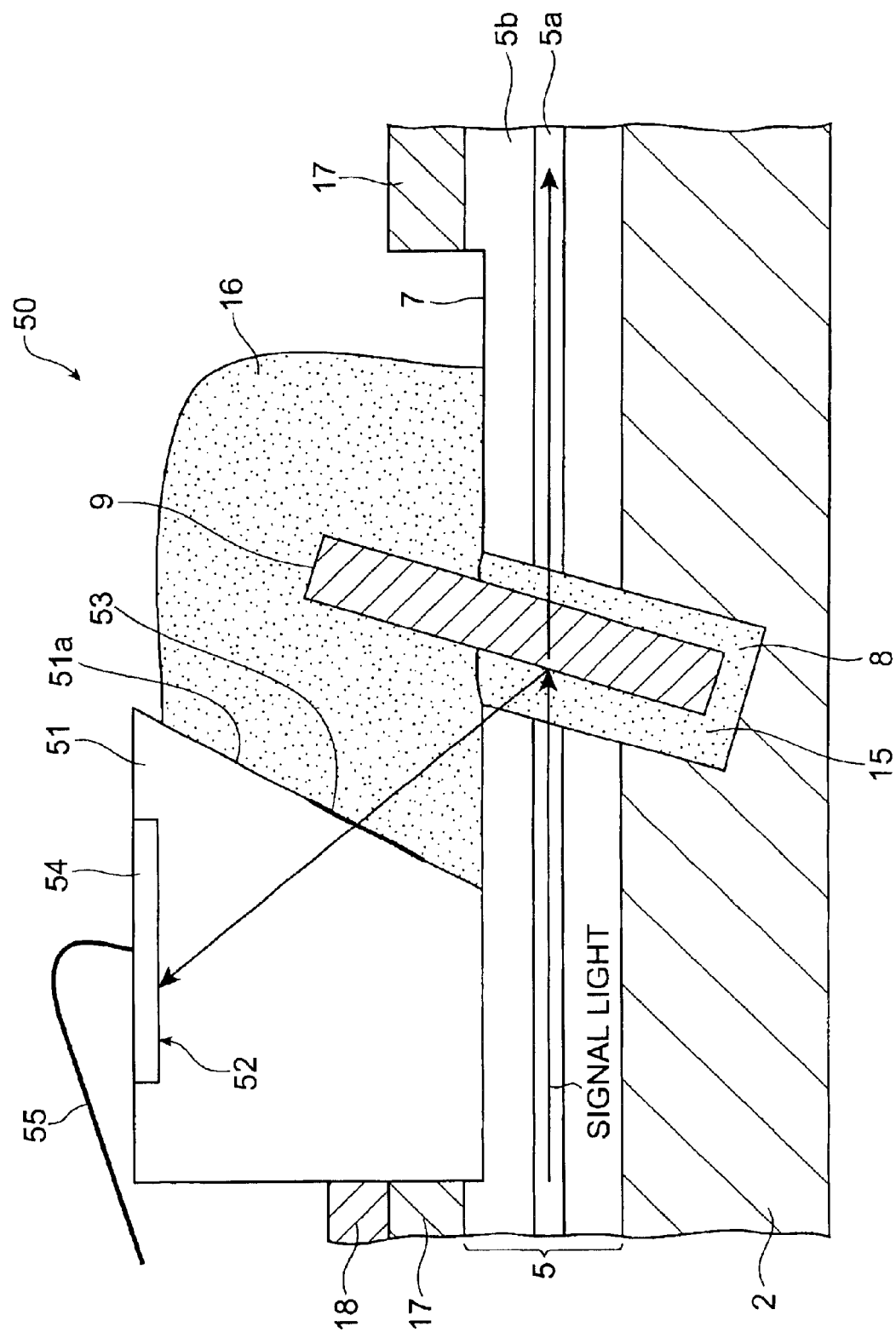
FIG. 6 is a vertical sectional view showing a part of the optical device in accordance with a fourth embodiment.

FIG. 6 is a vertical sectional view showing a part of the optical device in accordance with a fourth embodiment of the present invention. In FIG. 6, members identical or equivalent to those in the first embodiment will be referred to with numerals identical thereto without repeating their explanations.

In FIG. 6, the optical device 50 in accordance with this embodiment comprises a photodetector array 51 disposed on a cladding-shaved part 7 of bare fibers 5, whereas the photodetector array 51 includes a plurality of back-entrance type photodetectors 52. The photodetector array 51 has a tilted surface 51a inclined by a desirable angle with respect to the upper face of the substrate 2, whereas a part of the tilted surface 51a constitutes light entrance surfaces 53 of the photodetectors 52. In the upper face part of the photodetector array 51, light-receiving parts 54 of the photodetectors 52 are disposed in parallel with a submount board 18, whereas the light-receiving parts 54 and wiring patterns (not depicted) on the submount board 18 are electrically connected to each other by wires 55.

When the light-receiving parts 54 of the photodetectors 51 are disposed in the upper face part of the photodetector array 51 as such, one light-receiving part 54 and one wiring pattern in the submount board 18, which is a wiring board, can directly be connected to each other with a single wire 55, whereby the number of connecting wires and the number of man-hours at the time of connecting can be cut down. Also, since the light-receiving parts 54 are disposed in parallel with the submount board 18, wire bonding can be carried out easily. The light-receiving parts 54 may not be parallel to the submount board 18.

Figure 7:
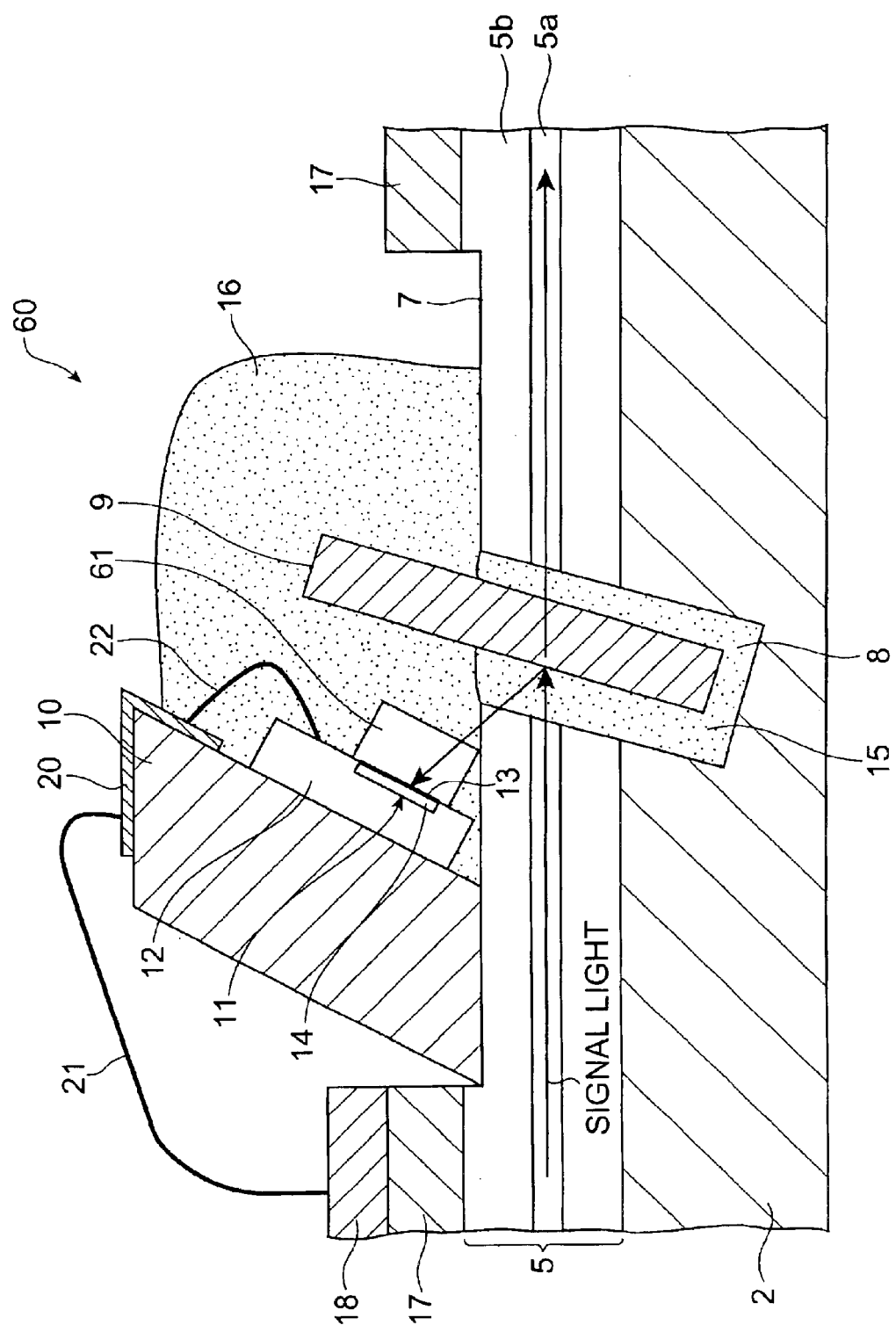
FIG. 7 is a vertical sectional view showing a part of the optical device in accordance with a fifth embodiment.

FIG. 7 is a vertical sectional view showing a part of the optical device in accordance with a fifth embodiment of the present invention. In FIG. 7, members identical or equivalent to those in the first embodiment will be referred to with numerals identical thereto without repeating their explanations.

In FIG. 7, the optical device 60 in accordance with the fifth embodiment comprises a light-guiding member 61 disposed on the light entrance surface 13 side of photodetectors 11. The light-guiding member 61 is constituted by a bundle of a number of optical fibers, for example, and guides the light reflected by the optical member 9 to the photodetectors 11 while absorbing the light without scattering it.

Such a light-guiding member 61 suppresses the incidence of scattering light onto the photodetectors 11, thereby further ameliorating the crosstalk between adjacent photodetectors 11.

Figure 8:
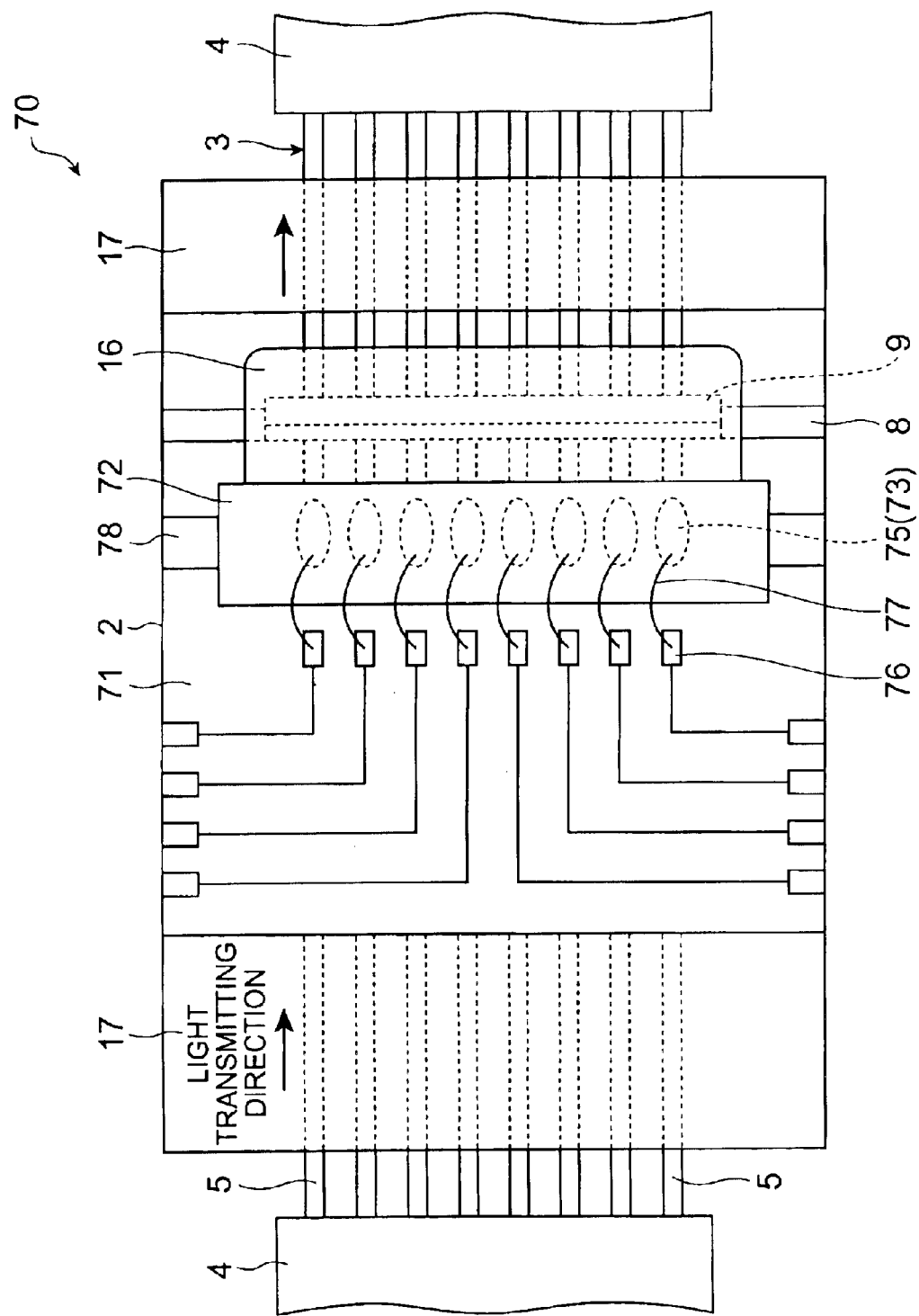
FIG. 8 is a plan view showing the optical device in accordance with a sixth embodiment.
Figure 9:
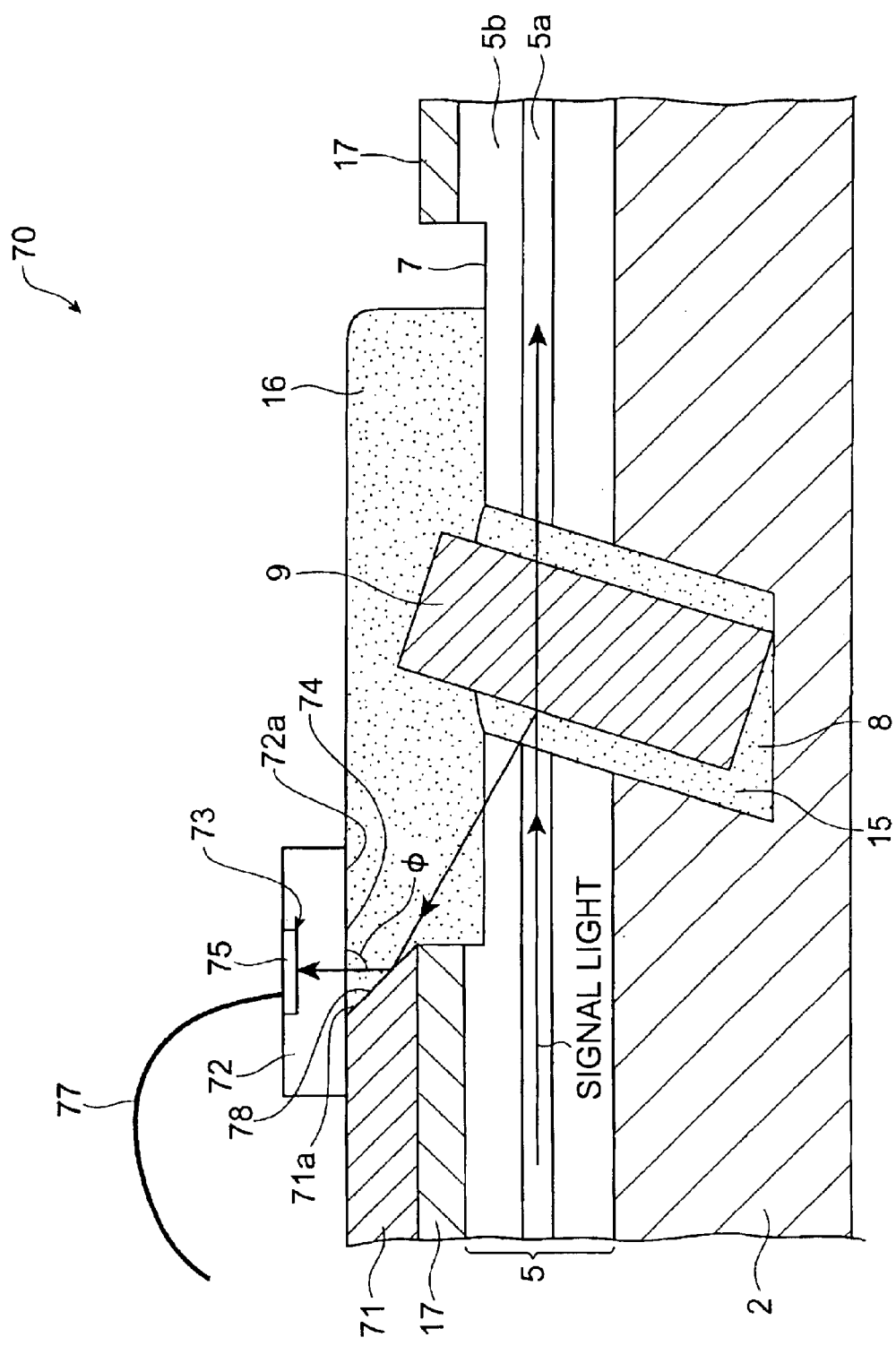
FIG. 9 is a vertical sectional view of a part of the optical device shown in FIG. 8.

FIG. 8 is a plan view showing the optical device in accordance with a sixth embodiment of the present invention, whereas FIG. 9 is a vertical sectional view showing a part of the optical device. In these drawings, members identical or equivalent to those in the first embodiment will be referred to with numerals identical thereto without repeating their explanations.

In FIGS. 8 and 9, the optical device 70 in accordance with the sixth embodiment comprises a submount board 71 disposed on the upper face of a lid 17, whereas the upper side of a substrate 2 including the location between an optical member 9 and the submount board 71 is filled with a refractive index matching resin 16.

Disposed on the upper side of the submount board 71 and refractive index matching resin 16 is a photodetector array 72 including a plurality of back-entrance type photodetectors 73. A part of the rear face (lower face) 72a of the photodetector array 72 constitutes light entrance surfaces 74 of the photodetectors 73. The light entrance surfaces 74 are parallel to the upper face of the substrate 2. The upper face part of the photodetector array 72 is provided with light-receiving parts 75 of the photodetectors 73. The submount board 71 is provided with a plurality of wiring patterns 76 corresponding to the respective photodetectors 73, whereas the wiring patterns 76 and the light-receiving parts 75 are electrically connected to each other by wires 77.

At an end part on the optical member 9 side, the submount board 71 has a tilted surface 71a inclined with respect to the upper face of the substrate 2, whereas a total reflection mirror 78 is secured onto the tilted surface 71a. The total reflection mirror 78 changes the optical path of light reflected by the optical member 9, such that the light is incident on the light entrance surfaces 74 of the photodetectors 73 at a predetermined angle. Here, the total reflection mirror 78 is preferably arranged such that the angle of incidence $\phi$ of reflected light with respect to the light entrance surfaces 74 becomes 70 to 110 degrees as mentioned above. This can lower the polarization dependence of light transmitted through the light entrance surfaces 74 of the photodetectors 73.

Though this embodiment is configured such that the light entrance surfaces 74 of the photodetectors 73 are parallel to the upper face of the substrate 2, the light entrance surfaces 74 may be tilted with respect to the upper face of the substrate 2. In this case, the angle of inclination of the total reflection mirror 78 with respect to the upper face of the substrate 2 is set such that the angle of incidence $\phi$ of reflected light with respect to the light entrance surfaces 74 becomes a desirable angle. Providing the total reflection mirror 78 as such allows the photodetectors 73 to have a degree of freedom in their postures.

As the optical path changing means for changing the optical path of the light reflected by the optical member 9, members other than the total reflection mirror 78 may also be used.

Though preferred embodiments of the optical device in accordance with the present invention are explained in the foregoing, the present invention is not limited to the above-mentioned embodiments. For example, though the optical member 9 inserted in the transverse groove 8 of the substrate 2 reflects a part of the signal light transmitted through the bare fibers 5, optical members diffracting a part of the signal light transmitted through the bare fibers 5 can also be used.

The optical device in accordance with the present invention will further be explained.

Figure 10:
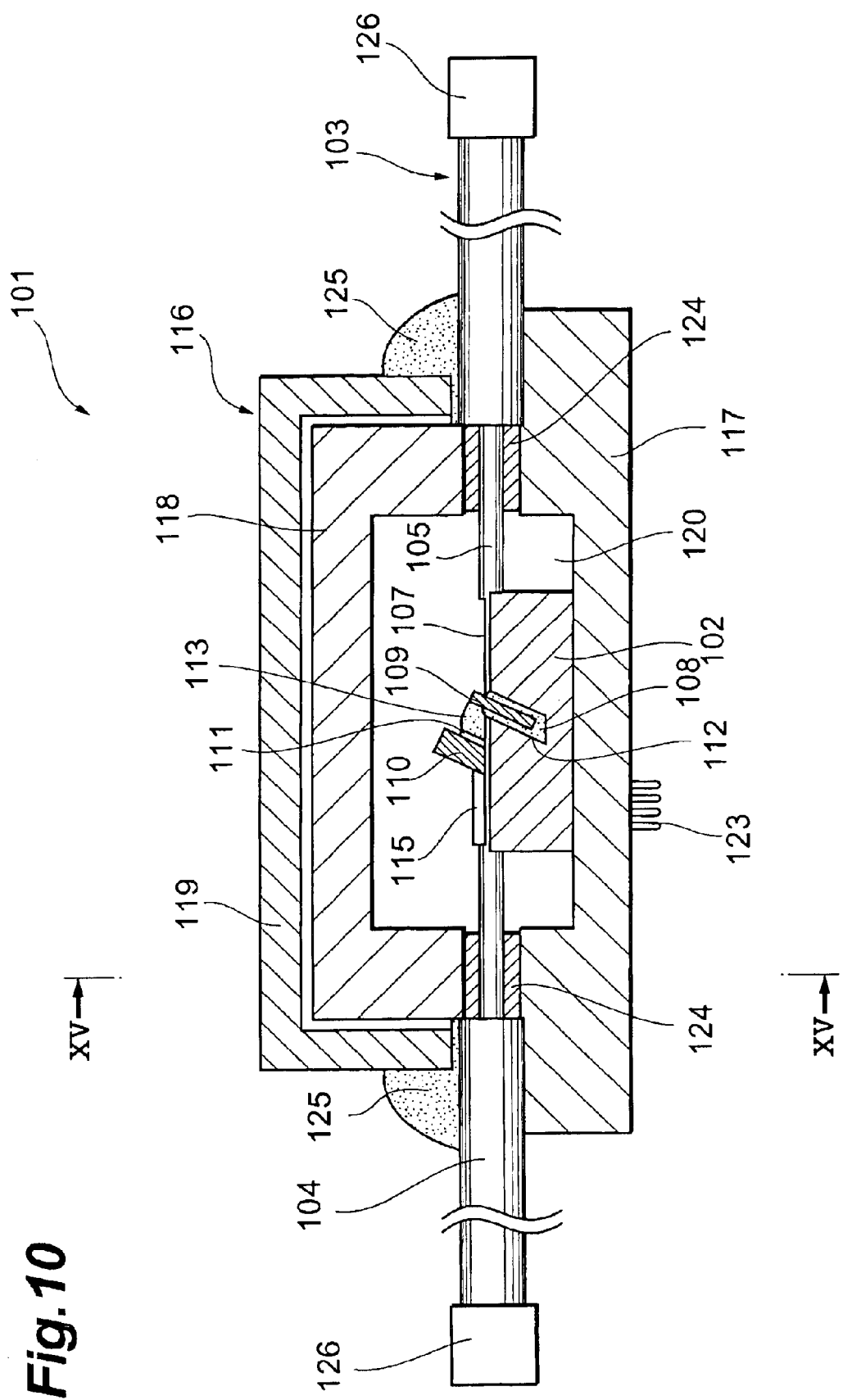
FIG. 10 is a vertical sectional view showing the optical device in accordance with a seventh embodiment.
Figure 11:
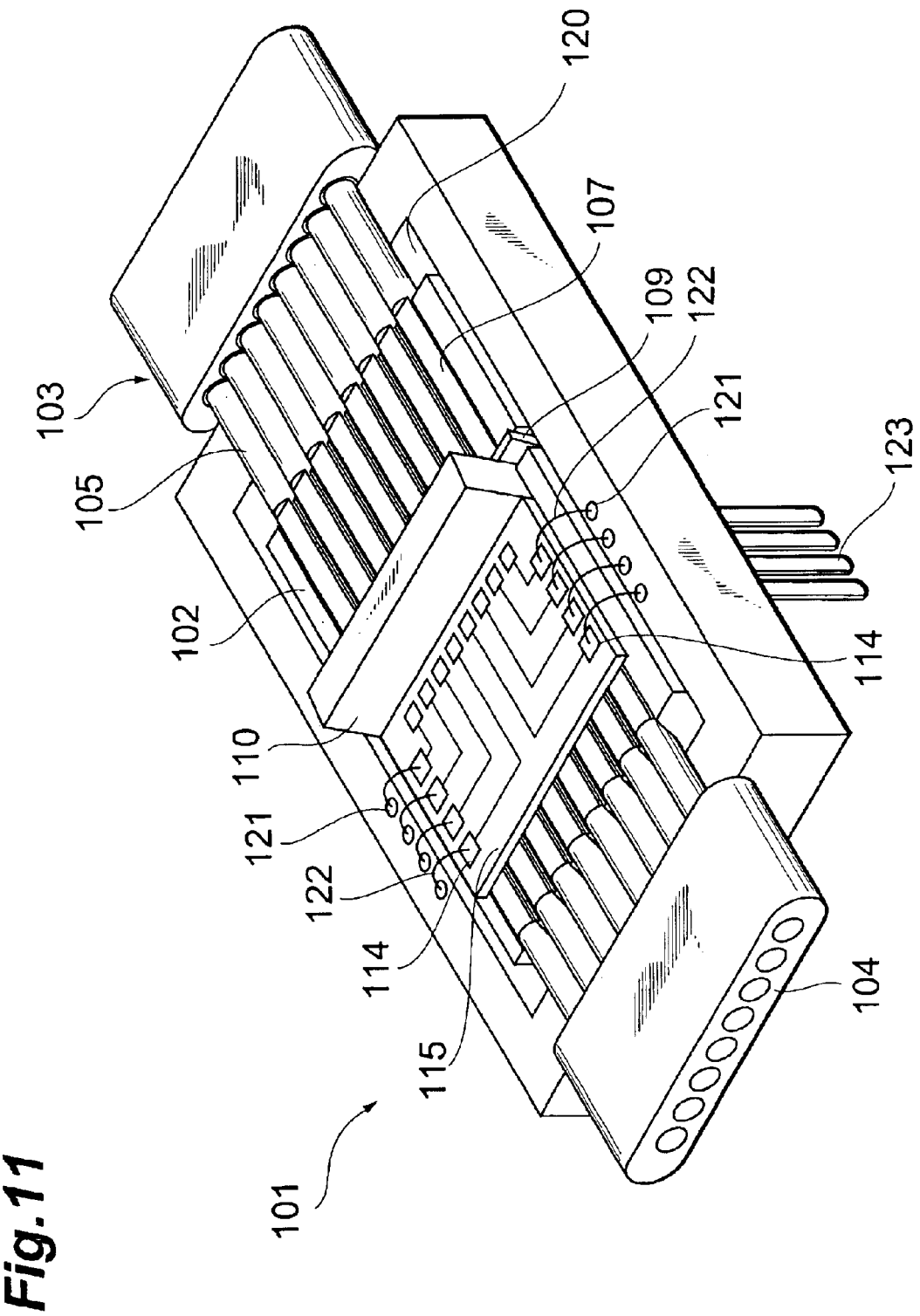
FIG. 11 is a perspective view of a part of the optical device shown in FIG. 10.
Figure 12:
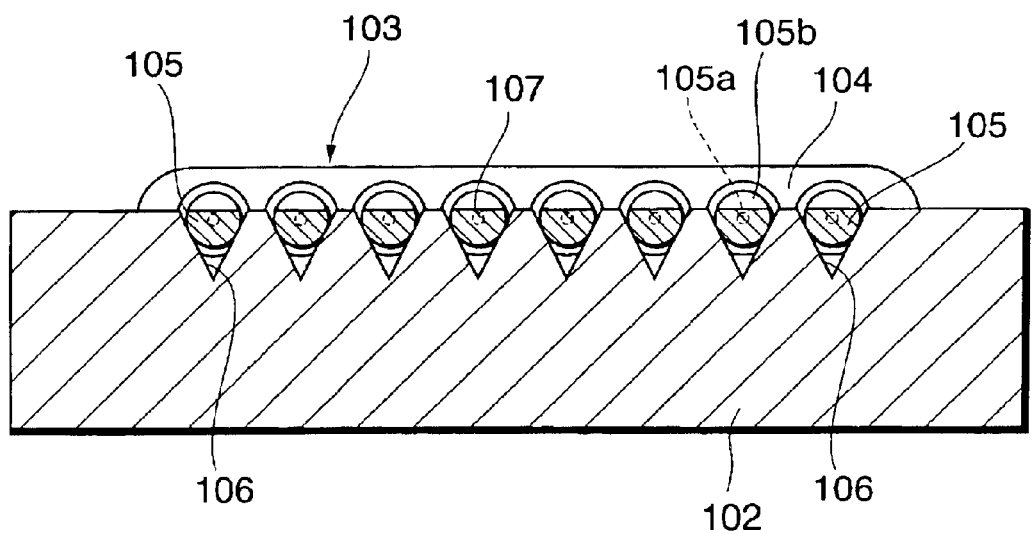
FIG. 12 is a sectional view of the substrate shown in FIG. 10.

FIG. 10 is a vertical sectional view showing the optical device in accordance with a seventh embodiment of the present invention, whereas FIG. 11 is a perspective view showing apart of the optical device. In these drawings, the optical device 101 in accordance with the seventh embodiment comprises a substrate 102, whereas a plurality of bare fibers 105 exposed from a multicore (eight-core here) coated optical fiber tape 103 by removing a coating 104 from its middle part are secured to the upper face of the substrate 102. As shown in FIG. 12, the upper face of the substrate 102 is formed with a plurality of fiber-positioning V grooves 106, whereas the bare fibers 105 are secured to the substrate 102 by an adhesive or the like while in a state arranged in their respective V grooves 106.

Figure 13A:
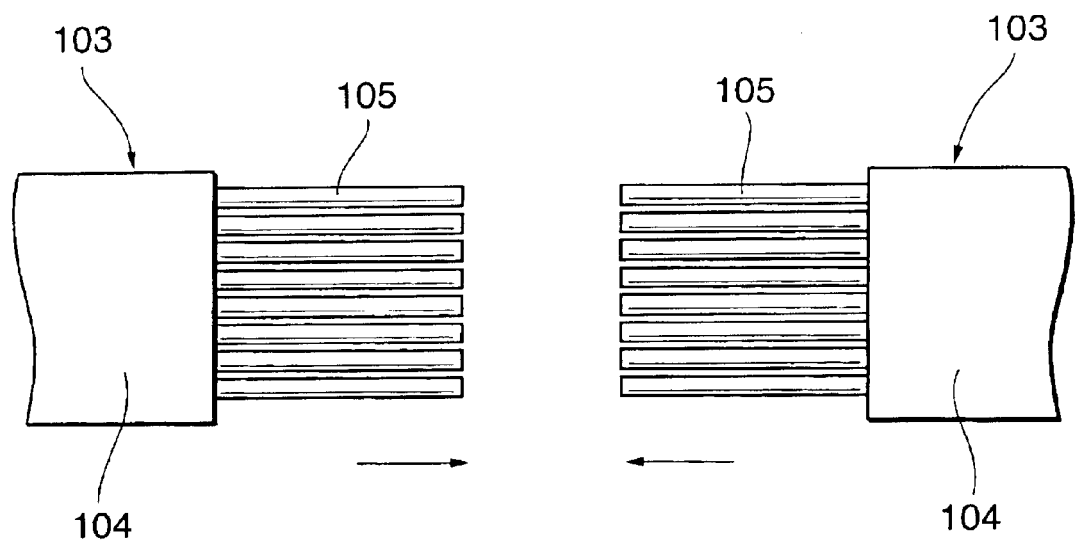
FIGS. 13A and 13B are views showing an example of method of exposing a bare fiber in a middle part of the coated optical fiber tape shown in FIG. 10.
Figure 13B:
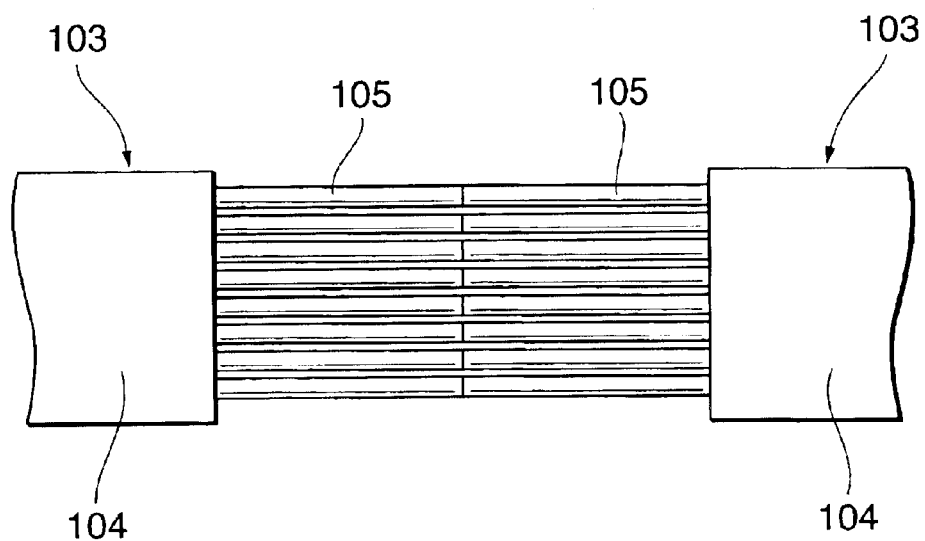

As shown in FIGS. 13A and 13B, a preferred method of exposing the bare fibers 105 in the middle part of the coated optical fiber tape 103 comprises the steps of preparing two coated optical fiber tapes 103, exposing bare fibers 105 by removing the coating 104 at terminal parts of the coated optical fiber tapes 103, and connecting the leading ends of the bare fibers 105 to each other. Here, the bare fibers 105 opposing each other may be inserted into the fiber-positioning V grooves 106 from both sides of the substrate 102 so as to abut against each other, and secured to the substrate 102 in this state, whereby the bare fibers 105 are connected to each other, or the bare fibers 105 may be fusion-spliced to each other. In this case, the coating 104 of the coated optical fiber tape 103 can be removed easily, whereby the workability improves.

After the coating 104 is removed from the coated optical fiber tape 103, the bare fibers 105 must be handled carefully so as not to be damaged. When removing the coating 104 at the terminal parts of the coated optical fiber tape 103, the handling of bare fibers 105 becomes easier in the process of making the optical device 101 (which will be explained later). Without being restricted to the above-mentioned method, the coating 104 may directly be removed from the middle part of the coated optical fiber tape 103 as a matter of course.

Figure 14:
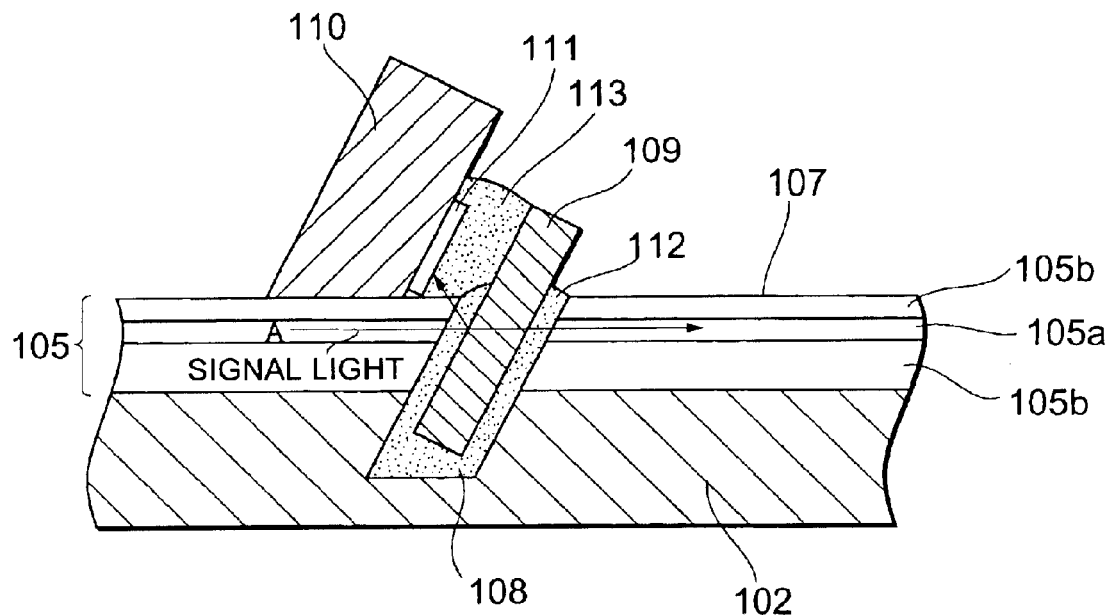
FIG. 14 is an enlarged sectional view of a part including the optical member and light-receiving device shown in FIG. 10.

Each bare fiber 105 comprises a core 105a and a cladding 105b disposed thereabout (see FIGS. 12 and 14). The bare fiber 105 secured onto the substrate 102 includes a cladding-shaved part 107 formed by shaving the upper side of the cladding 105b toward the central axis of the bare fiber 105. Except for the cladding-shaved part 107, the surface of the bare fiber 105 exposed from the coating 104 of the coated optical fiber tape 103 is plated with a metal such as Ni and Au.

The substrate 102 is provided with a transverse groove 108 extending in a direction in which the bare fibers 105 are aligned. The transverse groove 108 is formed obliquely with respect to axes of the bare fibers 105 so as to divide the bare fibers 105. Inserted in the transverse groove 108 as shown in FIG. 14 is an optical member 109 by which a part of signal light transmitted through the bare fibers 105 is reflected obliquely upward at a predetermined reflectance. The optical member 109 is disposed obliquely with respect to the axis of each bare fiber 105 in conformity to the transverse groove 108.

Disposed on the cladding-shaved part 107 of the bare fibers 105 is a support member 110 extending in a direction in which the bare fibers 105 are aligned. Attached to the surface opposing the reflecting surface of the optical member 109 in the support member 110 are a plurality of (eight here) photodetectors (light-receiving devices) 111 for detecting the light reflected by the optical member 109. Here, the optical axis of each photodetector 111 must be aligned with its corresponding bare fiber 105. However, instead of the coating 104 of the coated optical fiber tape 103, the bare fibers 105 are arranged on the substrate 102, whereby the optical axis alignment of each photodetector 111 can be effected easily. Also, since each photodetector 111 is disposed on the upper side of the cladding-shaved part 107 of the bare fibers 105, the distance between the light-reflecting points of the optical member 109 and their corresponding photodetectors 111 becomes shorter, whereby the crosstalk between the photodetectors 111 can effectively be suppressed.

The transverse groove 108 is filled with a refractive index matching resin 112 for yielding a refractive index matching the core 105a of each bare fiber 105. By curing the refractive index matching resin 112, the optical member 109 is secured to the substrate 102. Provided between the optical member 109 and each photodetector 111 is a refractive index matching resin 113 having a refractive index on a par with that of the refractive index matching resin 112. Silicone resins and the like are used as the refractive index matching resins 112, 113. When such refractive index matching resins 112, 113 are provided, no surface of discontinuity occurs in terms of refractive index between each bare fiber 105 and the optical member 109 and between the optical member 109 and each photodetector 111, i.e., in the optical path, whereby inconveniences such as reflection and scattering of light are prevented from occurring.

Here, a resin having a low viscosity is used as the refractive index matching resin 112, since it is necessary for the resin to fully flow into the narrow gap between side faces of the transverse groove 108 and the optical member 109. Specifically, the resin preferably has a viscosity of 50 Pa·s or less at room temperature (15° C. to 35° C.), more preferably 20 Pa·s or less at room temperature. As a consequence, the whole transverse groove 108 can reliably be filled with the refractive index matching resin 112.

Preferably, a resin having a thixotropy with a high viscosity is used as the refractive index matching resin 113, so as to stay between the optical member 109 and each photodetector 111 after being applied. Specifically, a resin having a thixotropy of 1.1 or higher at room temperature is preferable in particular. As a consequence, the refractive index matching resin 113 cures while staying and hardly flowing between the optical member 109 and each photodetector 111.

Preferably, the refractive index matching resin 113 has a viscosity higher than that of the refractive index matching resin 112. When a resin having a low viscosity is used as the refractive index matching resin 112, the resin 112 fully enters and fills the narrow space between the side faces of the transverse groove 108 and the optical member 109. When a resin having a higher viscosity is used as the refractive index matching resin 113, the resin 113 applied between the optical member 109 and the photodetectors 111 cures without easily flowing.

As shown in FIG. 11, a submount board 115 including a plurality of wiring patterns 114 is disposed on the rear side (the side opposite from the photodetectors 111) of the support member 110 on the cladding-shaved part 107 of the bare fibers 105. The wiring patterns 114 are electrically connected to the respective photodetectors 111 with wires (not depicted).

Also, the optical device 101 comprises a package 116 secured to the coated optical fiber tape 103 so as to seal the photodetectors 111 hermetically. From the viewpoint of processibility and strength, the package 116 is formed from a metal such as Ni and Au, or a material such as glass and ceramics having a surface plated with a metal such as Ni and Au.

The package 116 is constituted by a package body 117, a package inner lid 118 disposed on the upper side of the package body 117, and a package outer lid 119 disposed on the outside of the package inner lid 118.

The package body 117 is provided with a substrate-accommodating recess 120, whereas the substrate 102 is mounted on the bottom part of the substrate-accommodating recess 120. The coating 104 of the coated optical fiber tape 103 connected to the substrate 102 is supported at both end parts of the package body 117.

As shown in FIG. 11, a plurality of wiring patterns 121 are provided on the upper face of the package body 117 at both side parts, whereas the wiring patterns 121 are electrically connected to the respective wiring patterns 114 of the submount board 115 with wires 122. A plurality of electric terminals 123 project from the lower face of the package body 117 and are electrically connected to the respective wiring patterns 121.

Figure 15:
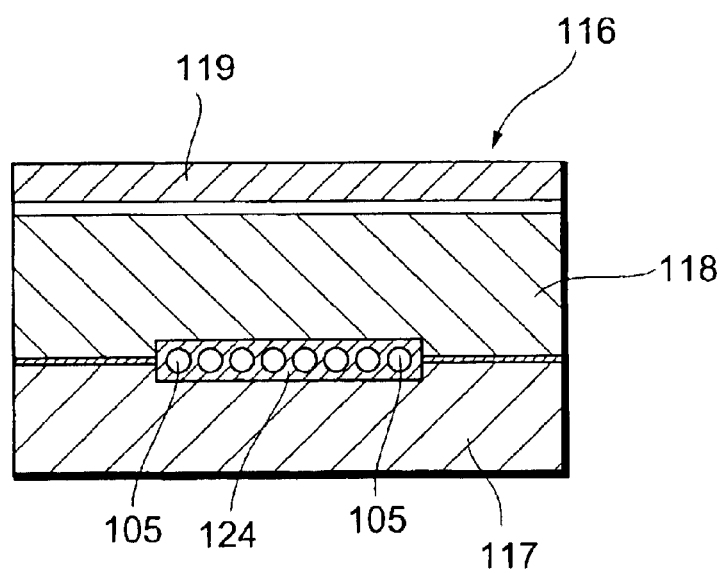
FIG. 15 is a sectional view taken along the line XV—XV of FIG. 10.

On the upper side of the package body 117, the package inner lid 118 is disposed so as to hold the bare fibers 105 between the package body 117 and the package inner lid 118. The bare fibers 105 are secured to the package body 117 and package inner lid 118 with solder 124. On both sides of each bare fiber 105, the package body 117 and the package inner lid 118 are secured to each other with the solder 124 (see FIG. 15). As the solder 124, Au—Sn solder, Sn—Pb solder, or the like is used. When the bare fibers 105, the package body 117, and the package inner lid 118 are secured to each other with the solder 124, the photodetectors 111 can hermetically be sealed in a simple and sufficient fashion.

On the upper side of the package body 117, the package outer lid 119 is provided so as to cover the package inner lid 118. The package outer lid 119 is arranged such that the coating 104 of the coated optical fiber tape 103 is held between the package body 117 and the package outer lid 119. The coating 104 is secured to the package outer lid 119 with a resin 125. On both sides of the coating 104, the package body 117 and the package outer lid 119 are secured to each other with the resin 125. As the resin 125, a thermosetting resin such as epoxy resin is used. Since not only the bare fibers 105, the package body 117, and the package inner lid 118 are secured to each other with the solder 124, but also the coating 104 and the package outer lid 119 are secured to each other with the resin 125 as such, the mechanical strength can fully be secured, whereby the reliability improves.

If a sufficient mechanical strength can be attained by just soldering the bare fibers 105, the package body 117, and the package inner lid 118 to each other, it is not necessary to provide the package outer lid 119 in particular.

An optical connector 126 such as MT connector is attached to each of both terminal parts of the coated optical fiber tape 103 drawn to the outside of such a package 116. This facilitates connections to external devices.

In thus configured optical device 101, signal light transmitted through the core part 105a of each bare fiber in the direction of A in FIG. 14 is transmitted through the refractive index matching resin 112 and optical member 109 within the transverse groove 108 so as to be further made incident on the core part 105a of the bare fiber and transmitted therethrough. Here, a part of the signal light is reflected by the optical member 109 toward the obliquely upper side of the upper face of the substrate 102. Thus reflected light reaches its corresponding photodetector 111 by way of the refractive index matching resin 113, and this photodetector 111 detects the optical intensity of the reflected light. The optical intensity is converted into an electric signal, and this electric signal is sent to an external device (not depicted) by way of its corresponding wiring pattern 114, wire 122, wiring pattern 121, and electric terminal 123.

Meanwhile, a light-receiving device, which is a photodetector, deteriorates its characteristics because of humidity in general. Therefore, when the photodetector is in a state exposed to an atmosphere, operations of the photodetector may become unstable so that the optical intensity of reflected light may not be monitored accurately. Also, moisture and the like may attach to the photodetector, so that operations of the photodetector may become unstable.

By contrast, the optical device 101 in accordance with this embodiment is configured such that the photodetectors 111 are completely sealed within the package 116 in an airtight fashion, whereby the photodetectors 111 are reliably protected against the external environment. As a consequence, there hardly occur cases where the photodetectors 111 deteriorate their characteristics depending on humidity or because of moisture and the like attaching thereto. Hence, a long-term operation stability is secured for the photodetectors 111, whereby the optical device improves its reliability.

A method of making the above-mentioned optical device 101 will now be explained with reference to the flowchart shown in FIG. 16.

Figure 16:
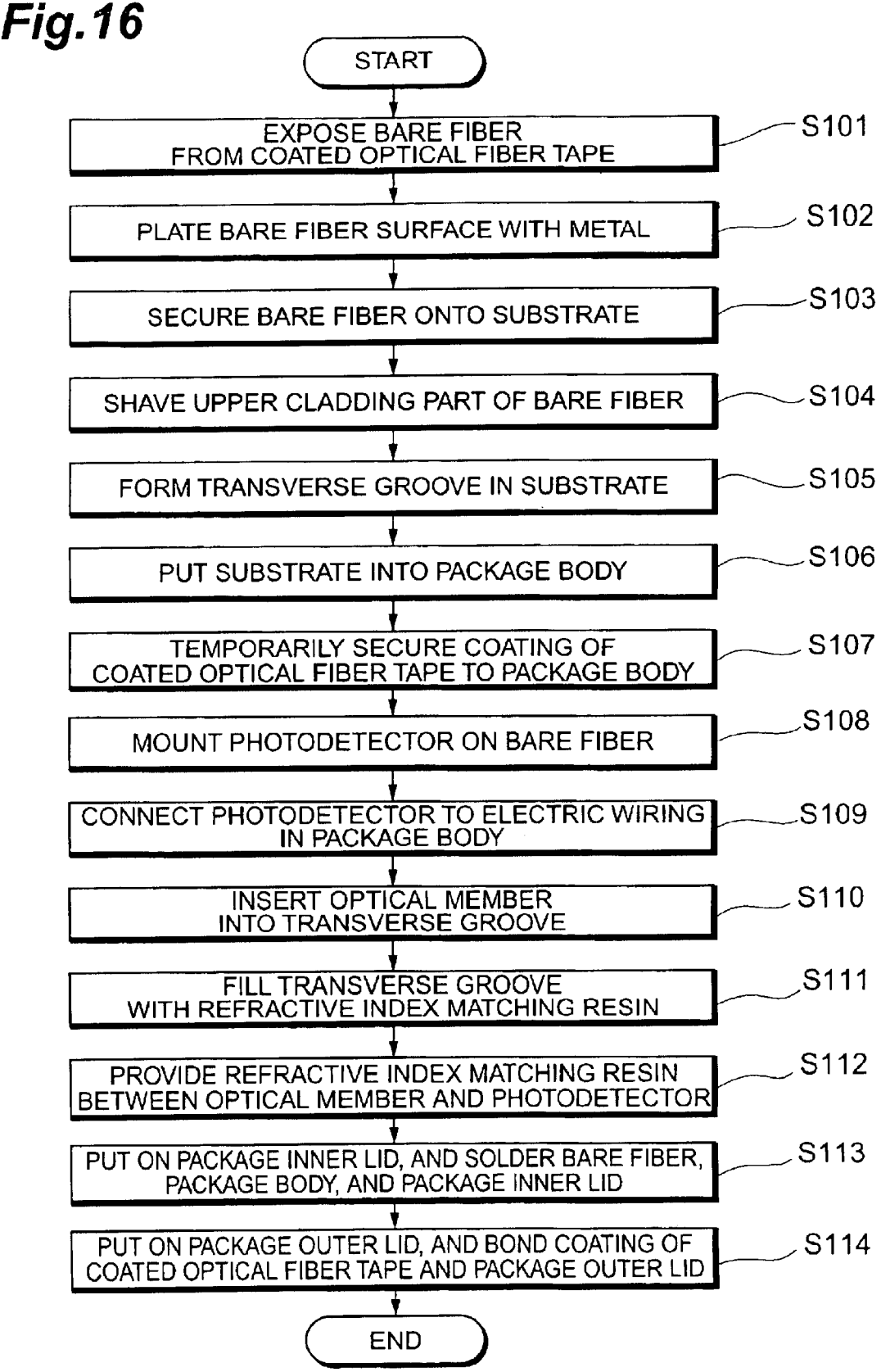
FIG. 16 is a flowchart illustrating a procedure of making the optical device shown in FIG. 10.

First, as shown in FIGS. 13A and 13B, bare fibers 105 are exposed by removing the coating 104 at terminal parts of two coated optical fiber tapes 103, and the leading ends of the bare fibers 105 are connected to each other, whereby a coated optical fiber tape 103 having bare fibers 105 exposed from its middle part is formed (step S101 in FIG. 16). Then, the surface of each bare fiber 105 exposed from the coating 104 of the coated optical fiber tape 103 is plated with a metal (step S102). Here, the bare fibers 105 may be plated before they are connected to each other.

Figure 17A:
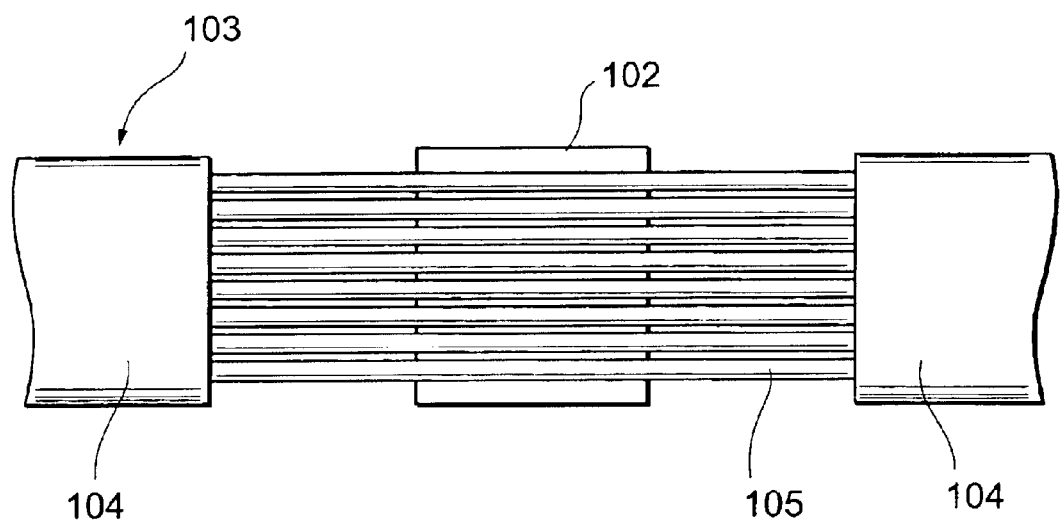
FIGS. 17A and 17B are plan and vertical sectional views, respectively, showing the process of step S103 in FIG. 16.
Figure 17B:
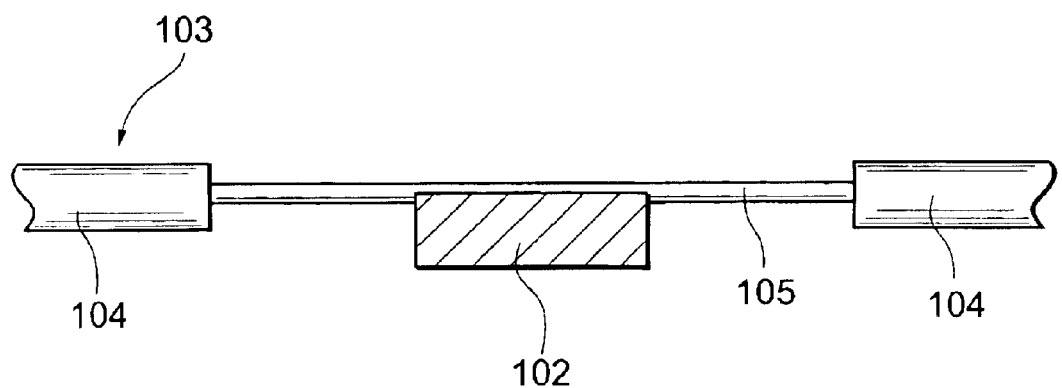

Subsequently, the bare fibers 105 are disposed and secured onto the substrate 102 as shown in FIGS. 17A and 17B (step S103).

Figure 18A:
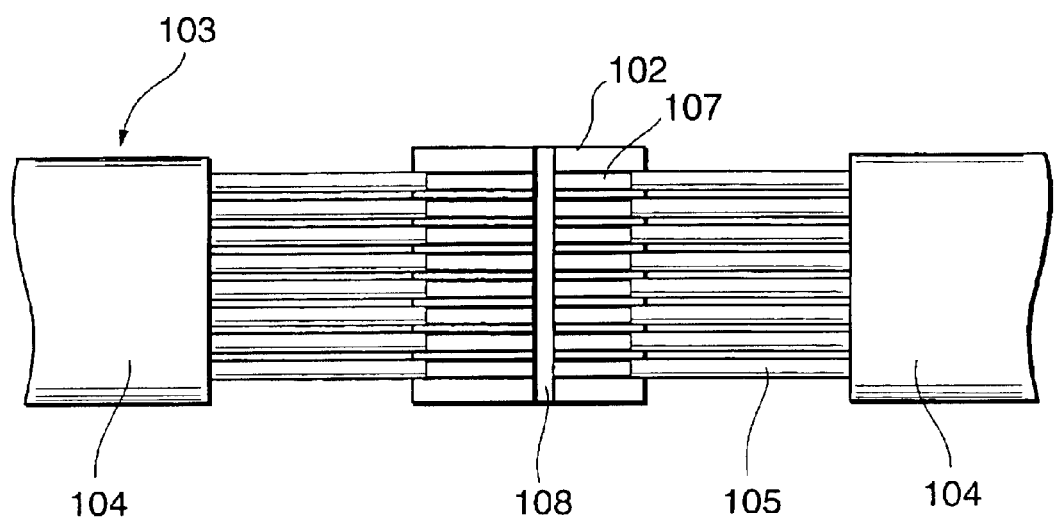
FIGS. 18A and 18B are plan and vertical sectional views, respectively, showing the process of steps S104 and S105 in FIG. 16.
Figure 18B:
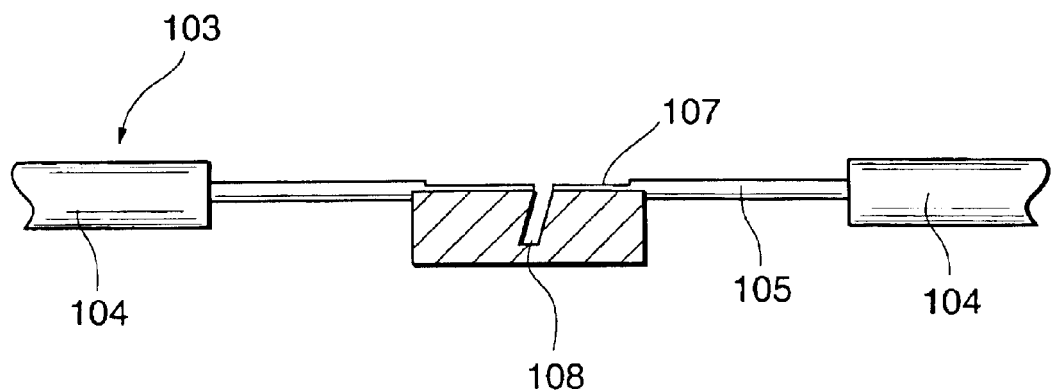

Next, as shown in FIGS. 18A and 18B, the upper cladding part of each bare fiber 105 on the substrate 102 is shaved with a dicer or the like, so as to form a cladding-shaved part 107 in apart of each bare fiber 105 (step S104). Then, the upper face of the substrate 102 is obliquely grooved, so as to form a transverse groove 108 (step S105). Here, on the substrate 102, the upper cladding part is shaved from the bare fibers 105 at the location formed with the transverse groove 108 and at the location where photodetectors 111 are placed.

Figure 19A:
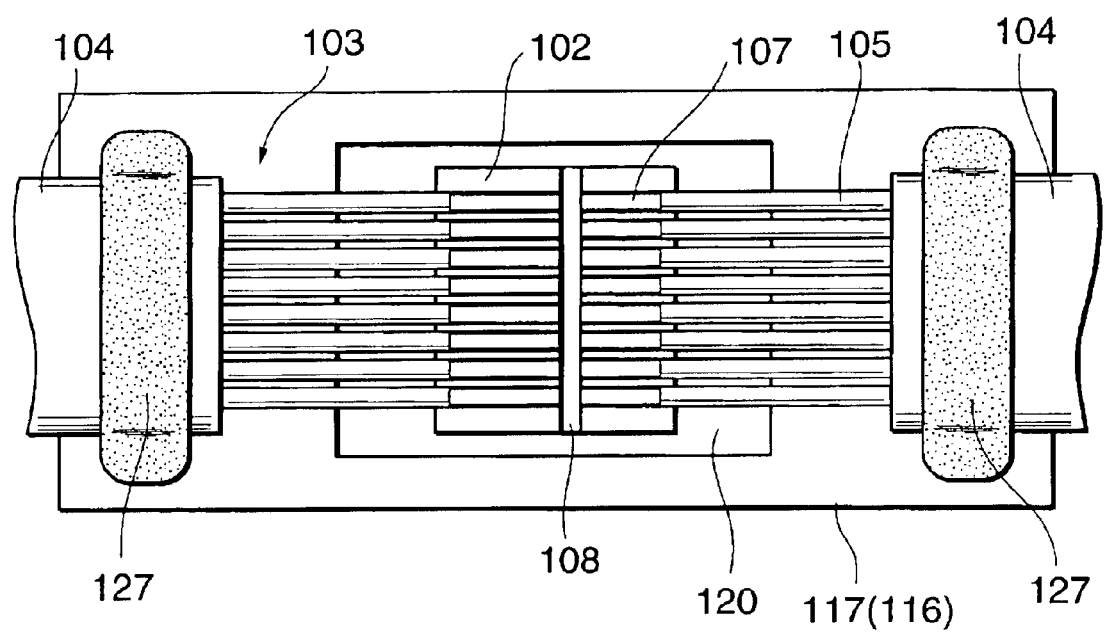
FIGS. 19A and 19B are plan and vertical sectional views, respectively, showing the process of steps S106 and S107 in FIG. 16.
Figure 19B:
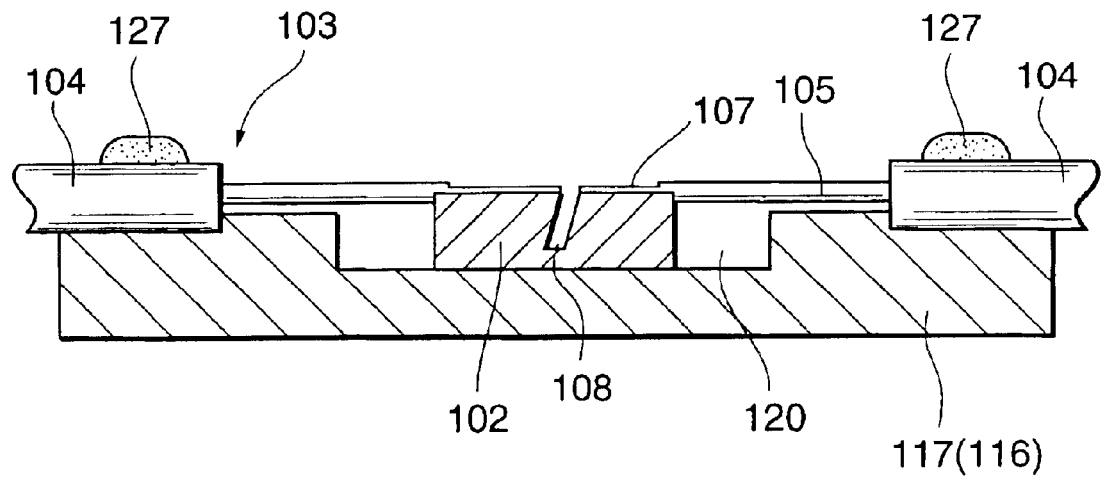

Subsequently, as shown in FIGS. 19A and 19B, the substrate 102 is accommodated in and secured to a substrate-accommodating recess 120 of a package body 117 of a package 116 (step S106). Then, the coating 104 of the coated optical fiber tape 103 is temporarily secured with a resin 127 onto the upper face of the package body 117 at both end parts (step S107). The bonding strength at this time is such that the coating 104 can be removed in a later step. Preferably employed as the resin 127 is a UV-curable resin which substantially cures upon UV ray irradiation alone. Here, it is preferred that the coated optical fiber tape 103 be flexed beforehand.

Figure 20A:
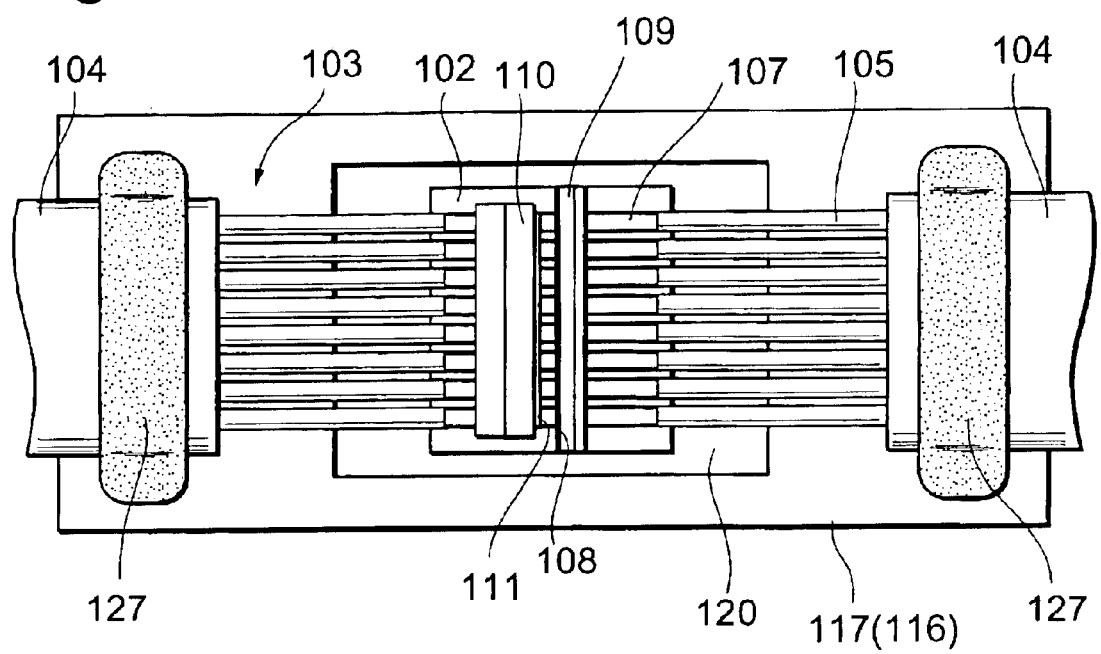
FIGS. 20A and 20B are plan and vertical sectional views, respectively, showing the process of steps S108 to S110 in FIG. 16.
Figure 20B:
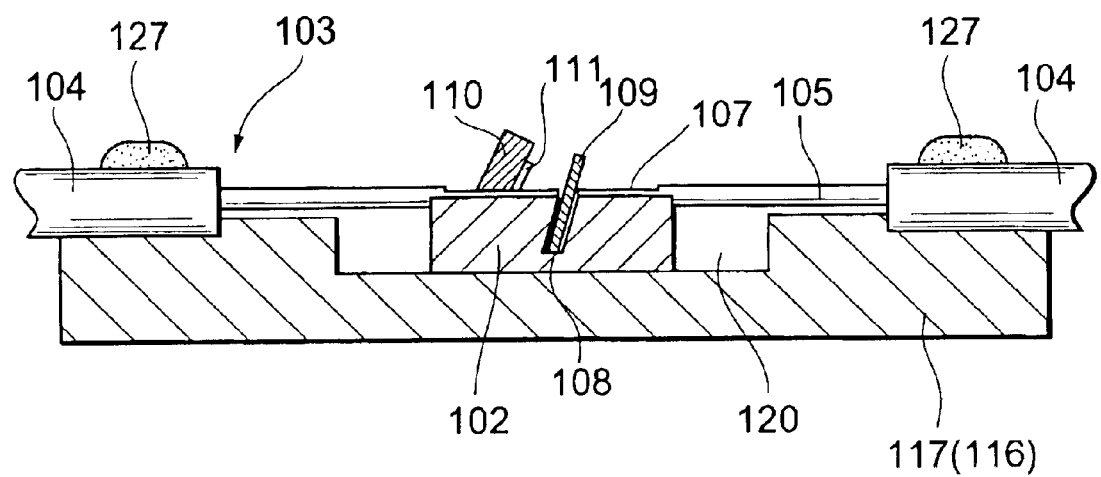

Next, as shown in FIGS. 20A and 20B, a support member 110 having a plurality of photodetectors 111 secured thereto and a submount board 115 (not depicted in FIGS. 20A and 20B) are mounted on the bare fibers 105 (step S108). Here, while aligning the optical axes of the photodetectors 111, the support member 110 is mounted on the bare fibers 105.

Then, though not depicted in FIGS. 20A and 20B, the photodetectors 111 and respective wiring patterns 114 of the submount board 115 are wire-bonded (electrically connected), whereas the wiring patterns 114 and their corresponding wiring patterns 121 in the package body 117 are wire-bonded (step S109).

Subsequently, an optical member 109 is inserted into the transverse groove 108 (step S110). Then, the transverse groove 108 is filled with a refractive index matching resin 112, so as to secure the optical member 109 (step S111). On the other hand, the space between the optical member 111 and the support member 110 is filled with a refractive index matching resin 113 (step S112).

Then, as shown in FIG. 10, a package inner lid 118 is put on such that the bare fibers 105 are held between the package body 117 and the package inner lid 118. Thereafter, the bare fibers 105, the package body 117, and the package inner lid 118 are secured to each other with solder 124, so that the optical members 111 are sealed hermetically (step S113).

When the thermal expansion coefficient of the material used for the package body 117 and package inner lid 118 differs from that of the bare fibers 105 as in this embodiment, the heat generated upon melting solder may cause the package body 117 and package inner lid 118 to expand/shrink, thereby generating positional deviations, or exerting an excessive tension on the coated optical fiber tape 103.

However, such inconveniences are reduced by this method, since the coating 104 of the coated optical fiber tape 103 is temporarily secured to the package body 117 as mentioned above. Also, since the resin 127 used for temporarily securing the coated optical fiber tape 103 is a UV-curable resin which substantially cures upon irradiation with UV rays alone as mentioned above, the UV-curable resin hardly reacts to the heat upon melting solder. As mentioned above, an amount of relative expansion of the package body 117 and the like upon heating is estimated, and the coated optical fiber tape 103 is flexed accordingly before temporarily securing the coated optical fiber tape 103, whereby the tension applied to the coated optical fiber tape 103 upon melting solder is absorbed. This reliably prevents the heat upon melting solder from causing positional deviations in the package body 117 and package inner lid 118 and applying an excessive tension to the coated optical fiber tape 103.

Here, it will be more effective if securing with solder is carried out while adjusting the heating temperature of solder 124 in addition to adjusting the tension to the coated optical fiber tape 103 as mentioned above. Preventing the coated optical fiber tape 103 from being provided with an excessive tension as such can avoid breaking of the bare fibers 105 and deterioration in their characteristics such as increase in loss. In general, when securing bare fibers and a package to each other with solder, it is preferred that at least one of the solder heating temperature and the tension to the coated optical fiber be adjusted.

Subsequently, as shown in FIG. 10, a package outer lid 119 is put on such that the coating 104 of the coated optical fiber tape 103 is held between the package body 117 and the package outer lid 119. Then, the coating 104 and the package outer lid 119 are bonded and secured to each other with a resin 125 (step S114). The optical device 101 is produced by the foregoing procedure.

Though the resin 127 is used for temporarily securing the coating 104 of the coated optical fiber tape 103 and the package body 117 to each other in the above-mentioned method, a jig may be used therefor. In this case, for example, a jig slidable longitudinally of the coated optical fiber tape 103 is provided, and the coating 104 and the package body 117 are clamped by the jig so as to be secured temporarily. When finally (permanently) securing the coating 104 and the package outer lid 119 to each other, the jig is slid so as to lower the tension while clamping the coating 104 and the package body 117 to each other.

When the coated optical fiber tape 103 is not flexed before temporarily securing the coating 104 of the coated optical fiber tape 103 and the package body 117 to each other, it is desirable that the temporarily secured part between the coating 104 and the package body 117 be opened so as to eliminate the residual tension of the coated optical fiber tape 103 before permanently securing the coating 104 and the package outer lid 119 to each other. Here, when the coating 104 and the package body 117 are temporarily secured to each other with a resin, the resin is peeled off from the interface or severed, so as to open the temporarily secured part.

Preferably, as mentioned above, the surface of a bare fiber is plated with a metal and then the bare fiber is positioned and secured onto the upper face part of a substrate in the step of securing the bare fiber to the substrate, whereas a package is secured to a coated optical fiber with solder so as to seal photodetectors hermetically in the step of securing the package to the coated optical fiber. Securing the package and the bare fiber with solder as such can hermetically seal the photodetectors in a simple and reliable fashion.

Preferably, in the step of securing the package to the coated optical fiber in this case, the coating of the coated optical fiber is temporarily secured to the package, the bare fibers and the package are secured to each other with solder thereafter, and the coating and the package are further secured to each other with a resin. When securing the package and the bare fibers to each other with solder, the heat upon melting solder may deform the package, thereby causing positional deviations or exerting an excessive tension onto the coated optical fiber. In this case, such inconveniences are reduced if the coating of the coated optical fiber is temporarily secured to the package.

The foregoing optical device 101 is used in an optical submarine cable system requiring a high reliability. In such an environment, failure modes such as increase in leakage current of photodetectors are induced depending on humidity. Therefore, in order to verify the reliability in photodetectors achieved by hermetic sealing, the optical device was subjected to an accelerated test, and the failure in time in an environment of actual use was estimated.

First, 44 samples of this device were subjected to a high-temperature, high-humidity, high-pressure test (pressure cooker test at a temperature of 121° C. with a humidity of 85% RH) for 2000 hours as an accelerated test, whereby the number of failures was zero.

Next, an acceleration coefficient was computed by using Arrhenius equation among chemical reaction theory models. In the Arrhenius equation, the acceleration coefficient K is represented by the following expression:

$$K = \frac{L_1}{L_2} = \frac{\exp(Ea/RT_1)}{\exp(Ea/RT_2)}$$
$$= \exp\left[\frac{Ea}{R} \times \left(\frac{1}{T_1} - \frac{1}{T_2}\right)\right]$$

where $L_1$ is the lifetime at temperature $T_1$ when actually in use, and $L_2$ is the lifetime at temperature $T_2$ in the accelerated test.

Here, Ea is the activation energy (eV), and R is the Boltzmann constant=8.6159×10⁵ (eV/K). Assuming that the actual temperature at which the device is used is 30° C., and the activation energy Ea is 0.8 eV, the acceleration coefficient K is:

$$K = \exp\left[\frac{0.8}{8.6159 \times 10^5} \times \left(\frac{1}{273+30} - \frac{1}{273+121}\right)\right]$$
$$= \text{about } 1{,}181 \text{ times}$$

Hence, the total test time T is:

failure in time =

$$\frac{\text{confidence level coefficient}}{\text{total test time}} = \frac{0.92}{1.04 \times 10^8} = 0.89 \times 10^{-8} = 0.89 \text{ Fit}$$

Since the number of failures due to the accelerated test is zero, assuming that the distribution of failures is an exponential distribution, $$T = \text{number of tests} \times \text{test time} \times \text{acceleration coefficient}$$
$$= 44 \times 2000 \times 1181 = \text{about } 1.04 \times 10^8 \text{ hours}$$

at a confidence level of 60% (coefficient of 0.92). From the foregoing, the failure in time in the environment where the optical device is actually in use is estimated to be 1 Fit or less. When an optical submarine cable system is configured so as to comprise an optical device exhibiting a reliability with a failure in time of 1 Fit or less as an airtight sealing characteristic as such, a highly reliable optical submarine cable system is realized.

Figure 21:
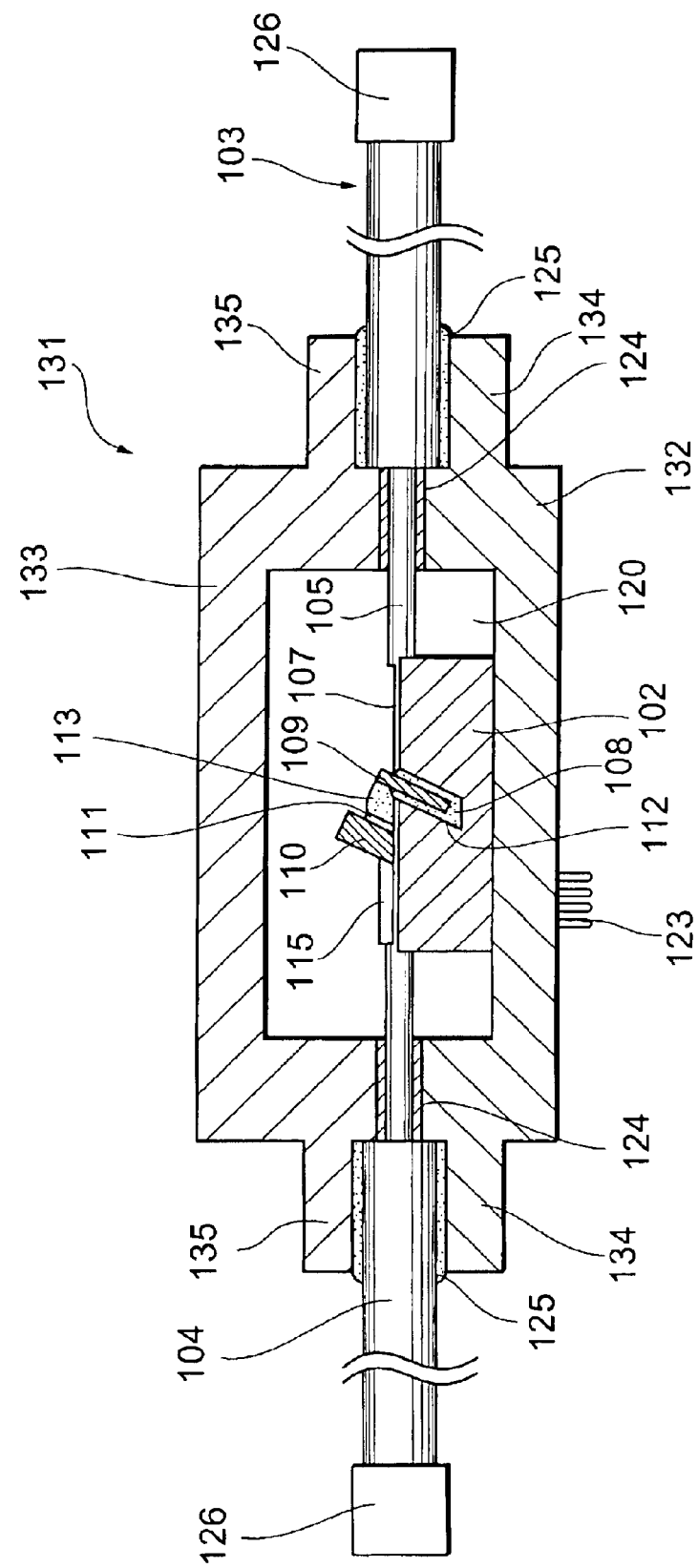
FIG. 21 is a vertical sectional view showing the optical device in accordance with an eighth embodiment.

FIG. 21 is a vertical sectional view showing the optical device in accordance with an eighth embodiment of the present invention. This embodiment differs from the seventh embodiment only in the structure for hermetically sealing photodetectors 111. In. FIG. 21, members and the like identical or equivalent to those in the seventh embodiment are referred to with numerals identical thereto without repeating their explanations.

In FIG. 21, the optical device 130 in accordance with the eighth embodiment comprises a package 131 secured to a coated optical fiber tape 103 so as to seal the photodetectors 111 hermetically. The package 131 is constituted by a lower package 132 having a substrate-accommodating recess 120, and an upper package 133 disposed on the upper side of the lower package 132. Both end parts of the lower package 132 are provided with coating-securing projections 134, whereas both end parts of the upper package 133 are provided with coating-securing projections 135 corresponding to the coating-securing projections 134.

The coated optical fiber tape 103 is held between the lower package 132 and the upper package 133. In this state, bare fibers 105 exposed from a coating 104 of the coated optical fiber tape 103 are secured to the lower package 132 and upper package 133 with solder 124. On the other hand, the coating 104 of the coated optical fiber tape 103 is secured to the coating-securing projections 134, 135 with a resin 125.

Such an optical device 130 can also sufficiently seal the photodetectors 111 hermetically while securing a desirable mechanical strength. Since the package 131 necessitates only two members, this configuration is advantageous in terms of cost.

Figure 22:
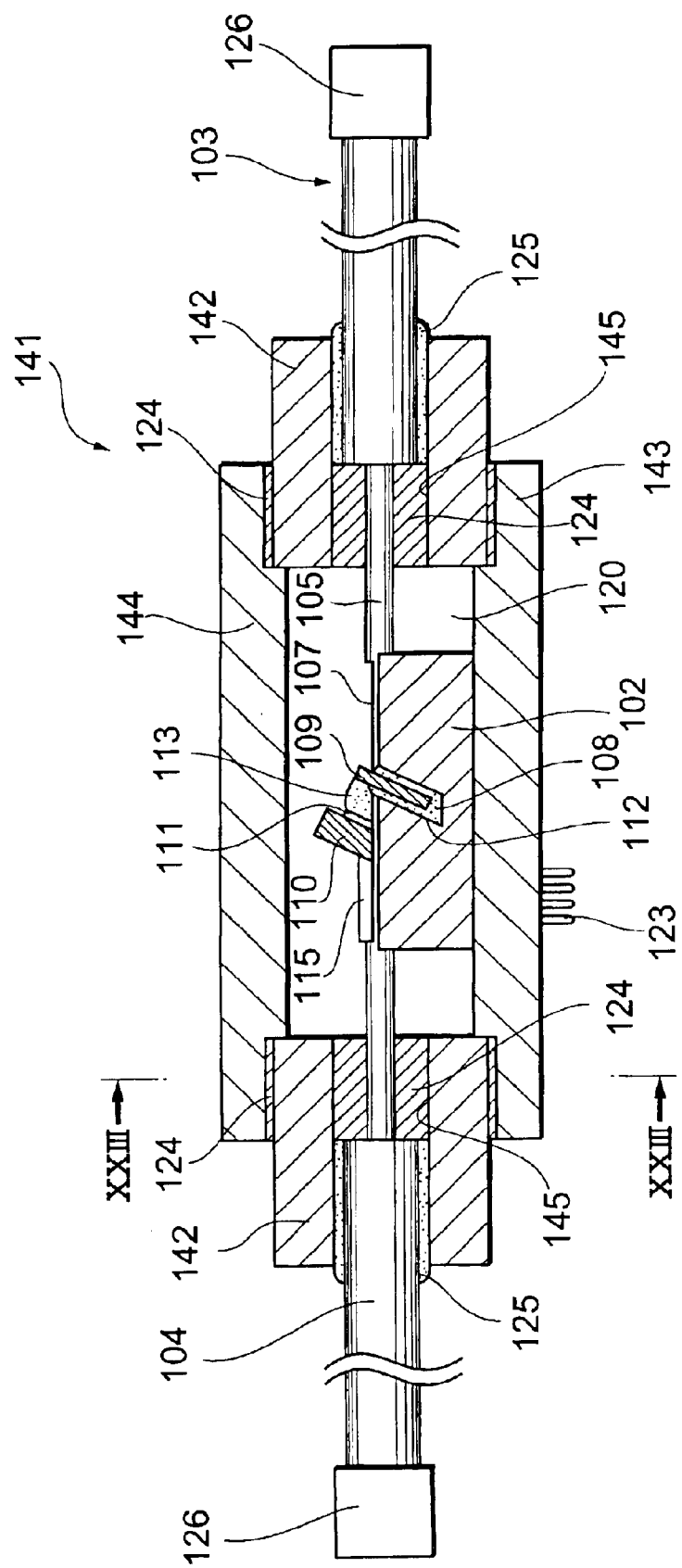
FIG. 22 is a vertical sectional view showing the optical device in accordance with a ninth embodiment.
Figure 23:
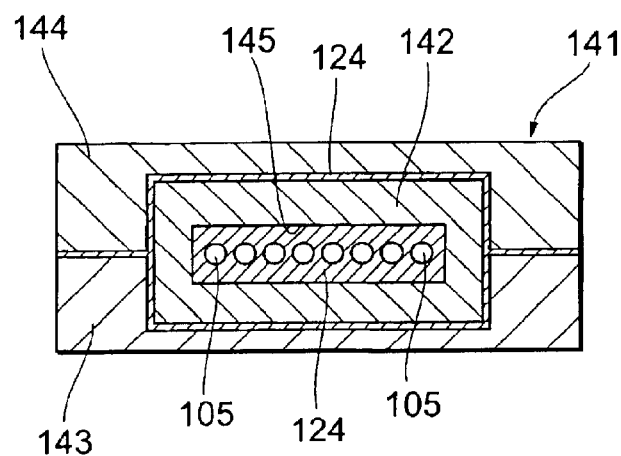
FIG. 23 is a sectional view taken along the line XXIII—XXIII of FIG. 22.

FIG. 22 is a vertical sectional view showing the optical device in accordance with a ninth embodiment of the present invention, whereas FIG. 23 is a sectional view taken along the line XXIII—XXIII of FIG. 22. This embodiment also differs from the seventh embodiment only in the structure for hermetically sealing photodetectors 111. In these drawings, members identical or equivalent to those in the seventh embodiment will be referred to with numerals identical thereto without repeating their explanations.

In FIGS. 22 and 23, the optical device 140 in accordance with the ninth embodiment comprises a package 141, and a pair of sleeves 142 attached to both end parts of the package 141 and secured to a coated optical fiber tape 103. The package 141 is constituted by a lower package 143 having a substrate-accommodating recess 120, and an upper package 144 disposed on the upper side of the lower package 143.

The sleeves 142 are secured to the lower package 143 and upper package 144 with solder 124. Each sleeve 142 has a securing through hole 145, through which a coated optical fiber tape 103 is inserted. Bare fibers 105 exposed from a coating 104 of the coated optical fiber tape 103 are secured to the sleeves 142 with solder 124 in the securing through holes 145, whereas the coating 104 of the coated optical fiber tape 103 is secured to the sleeves 142 with a resin 125 in the securing through holes 145.

When hermetically sealing the photodetectors 111 with such package 141 and sleeves 142, the coated optical fiber tape 132 is initially inserted through the securing through holes 145 of the sleeves 142. Subsequently, the bare fibers 105 and the sleeves 142 are secured to each other with solder 124, and then the coating 104 and the sleeves 142 are bonded and secured to each other with the resin 125. Thereafter, the sleeves 142 and the lower package 143 are secured to each other with solder 124, and the sleeves 142 and the upper package 144 are secured to each other with solder 124. Here, the sleeves 142 and the package 141 may be secured to each other with a resin as well.

Such an optical device 140 can also sufficiently seal the photodetectors 111 hermetically while securing a desirable mechanical strength. Since the bare fibers 105, which are fragile in terms of strength, are initially processed while using the sleeves 142 as an auxiliary attachment, this configuration facilitates the handling of the bare fibers 105 in later steps.

Though a material such as metal having a thermal expansion coefficient different from that of the bare fibers 105 is used as a material for the package in the above-mentioned embodiments, a material (such as silica glass) having a thermal expansion coefficient on a par with that of the bare fibers 105 may also be used. In this case, the heat for securing the bare fibers 105 and the package to each other with solder can easily suppress the tension exerted on the coated optical fiber tape 103.

Though the above-mentioned embodiments monitor the optical intensity of optical signals transmitted through bare fibers of a multicore coated optical fiber tape and the like, the present invention is also applicable to a single-core coated optical fiber as a matter of course.

Figure 24:
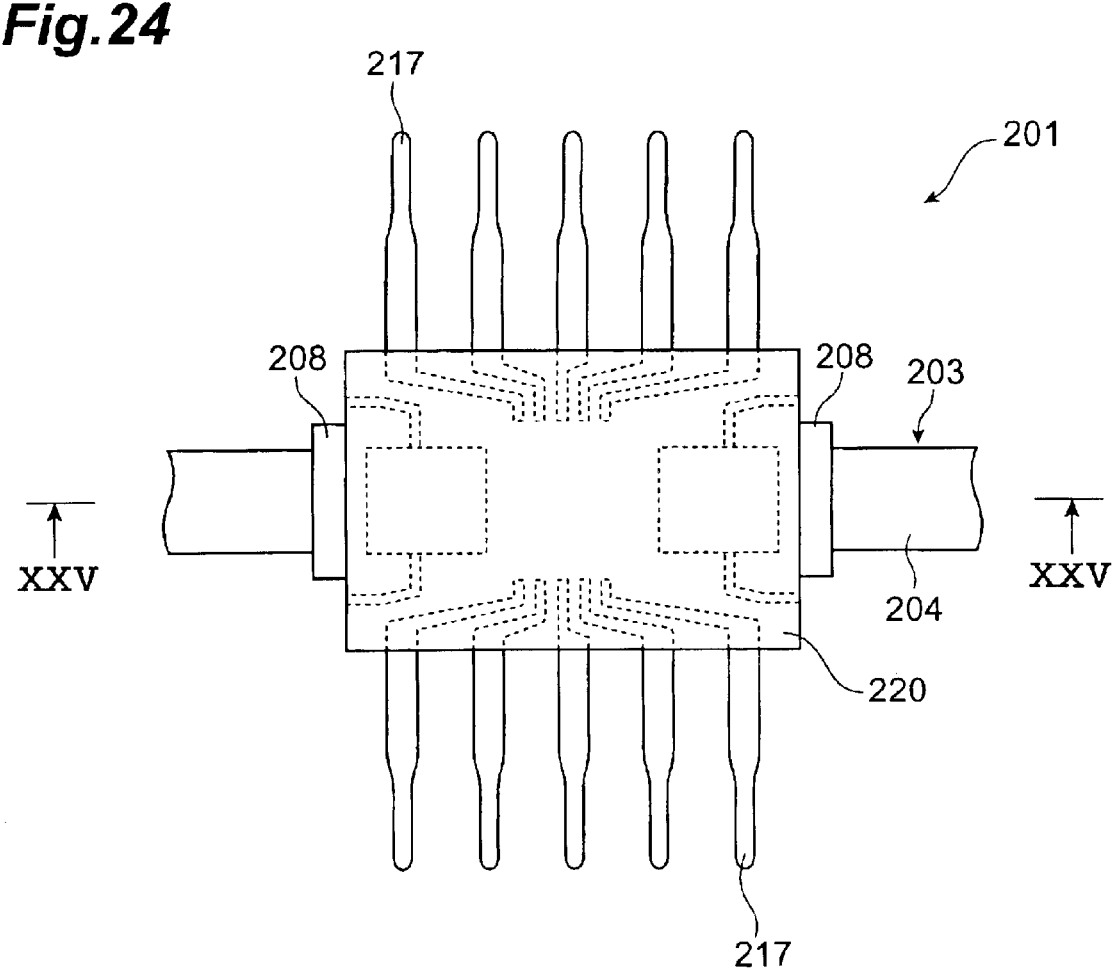
FIG. 24 is a plan view showing the optical device in accordance with a tenth embodiment.
Figure 25:
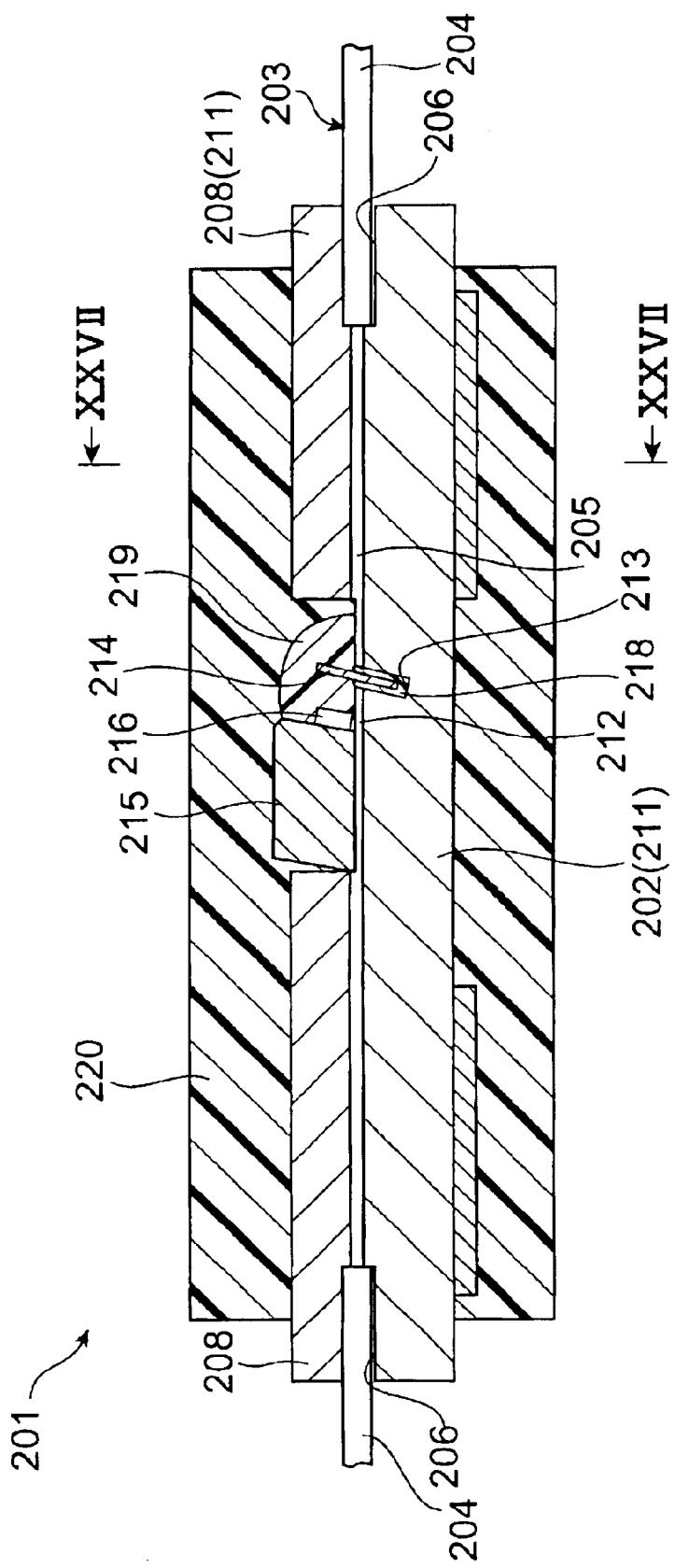
FIG. 25 is a sectional view taken along the line XXV—XXV of FIG. 24.
Figure 26:
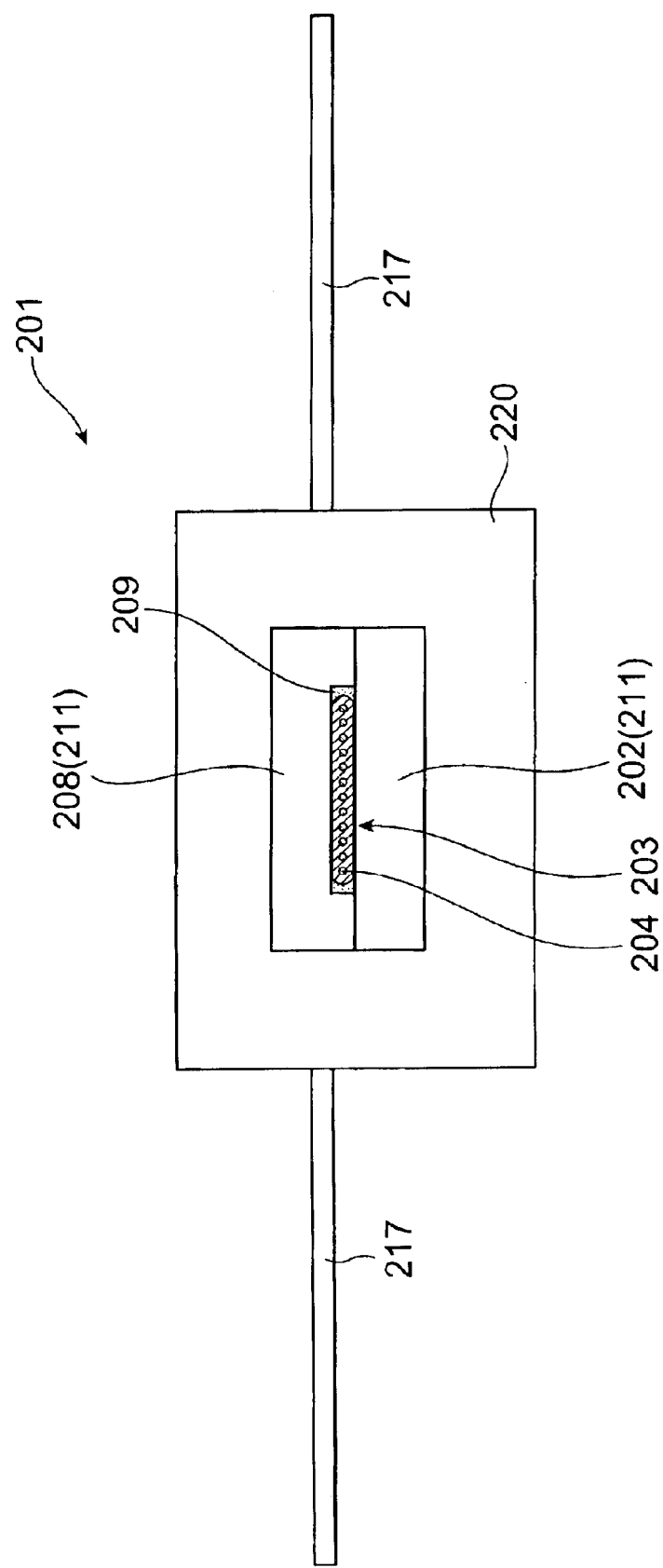
FIG. 26 is a front view of the optical device shown in FIG. 24.
Figure 27:
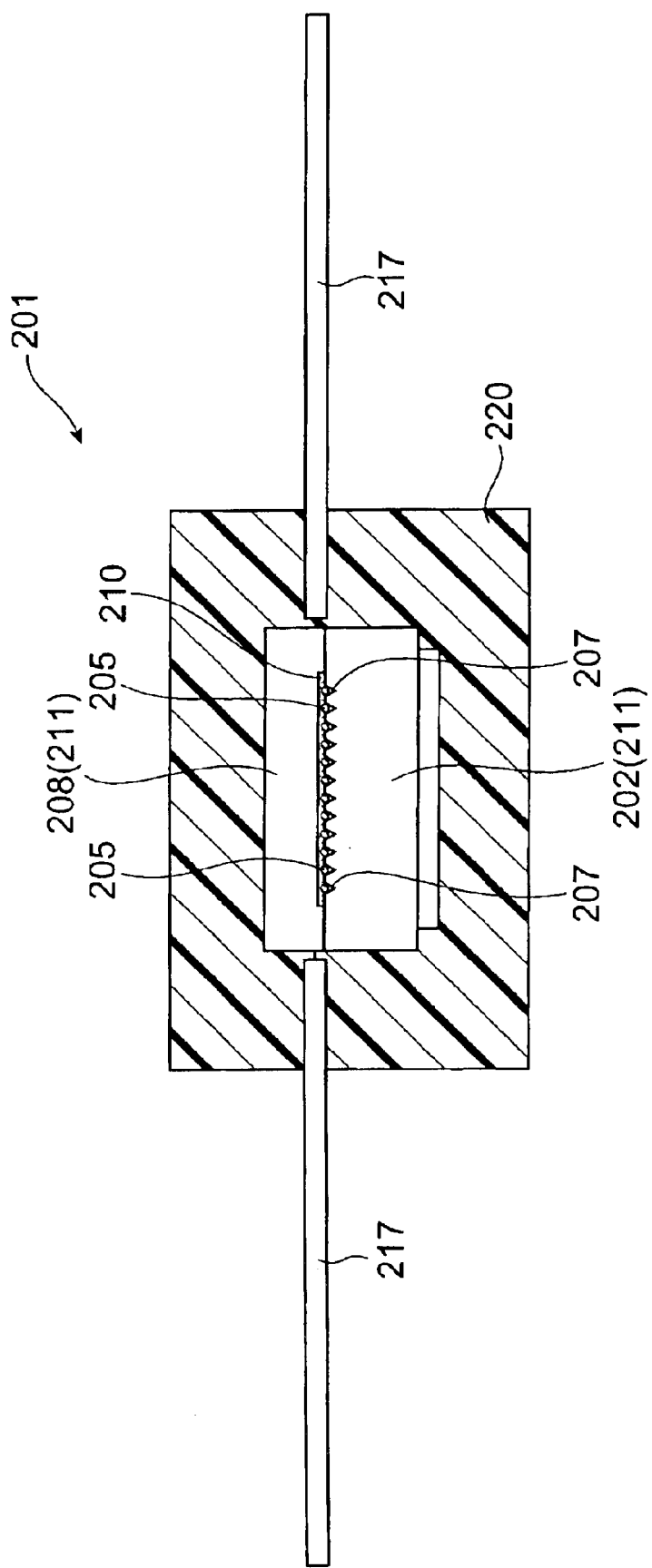
FIG. 27 is a sectional view taken along the line XXVII—XXVII of FIG. 25.

The optical device in accordance with a tenth embodiment of the present invention will now be explained with reference to FIGS. 24 to 28. FIG. 24 is a plan view of the optical device in accordance with this embodiment. FIG. 25 is a sectional view taken along the line XXV—XXV of FIG. 24. FIG. 26 is a front view of the optical device. FIG. 27 is a sectional view taken along the line XXVII—XXVII of FIG. 25.

In FIGS. 24 to 27, the optical device 201 in accordance with this embodiment comprises a substrate 202 formed from silicon, silica glass, or the like, whereas a plurality of bare fibers 205 exposed from a multicore coated optical fiber tape 203 by removing its coating 204 at a middle part are secured to the upper face part of the substrate 202. Steps 206 for mounting the coating 204 of the coated optical fiber tape 203 are formed at both end parts of the substrate 202. A plurality of V grooves 207 for positioning the bare fibers 205 in an aligned state are formed between the steps 206 in the substrate 202.

Disposed on both end sides of the substrate 202 are lids 208 for protecting the coating 204 and bare fibers 205 of the coated optical fiber tape 203. The lids 208 are formed from the same material as the substrate 202. Each lid 208 comprises a coating-accommodating recess 209 formed at a position corresponding to the step 206 of the substrate 202, and a bare-fiber-accommodating recess 210 formed at a position corresponding to the V grooves 207 of the substrate 202.

When assembling a fiber-securing member 211 comprising such substrate 202 and lids 208, the coating 204 of the coated optical fiber tape 203 is disposed at the steps 206 of the substrate 202, whereas the bare fibers 205 exposed from the coating 204 are arranged in the V grooves 207. In this state, the two lids 208 are attached to the upper face of the substrate 202 and secured thereto with an adhesive or the like. Then, spaces between the fiber-securing member 211 and the coating 204 and bare fibers 205 are filled with an adhesive, a bonding resin, or the like, whereby the coating 204 and the bare fibers 205 are secured to the fiber-securing member 211.

Thereafter, side faces of the substrate 202 and side faces of the lids 208 are shaved (machined) until they are flush with each other. If necessary, the lower face of the substrate 202 and the upper face of lids 208 are shaved. As a consequence, the fiber-securing member 211 can always have constant sizes in the vertical direction and lateral direction (in which the bare fibers 205 are aligned).

Figure 28:
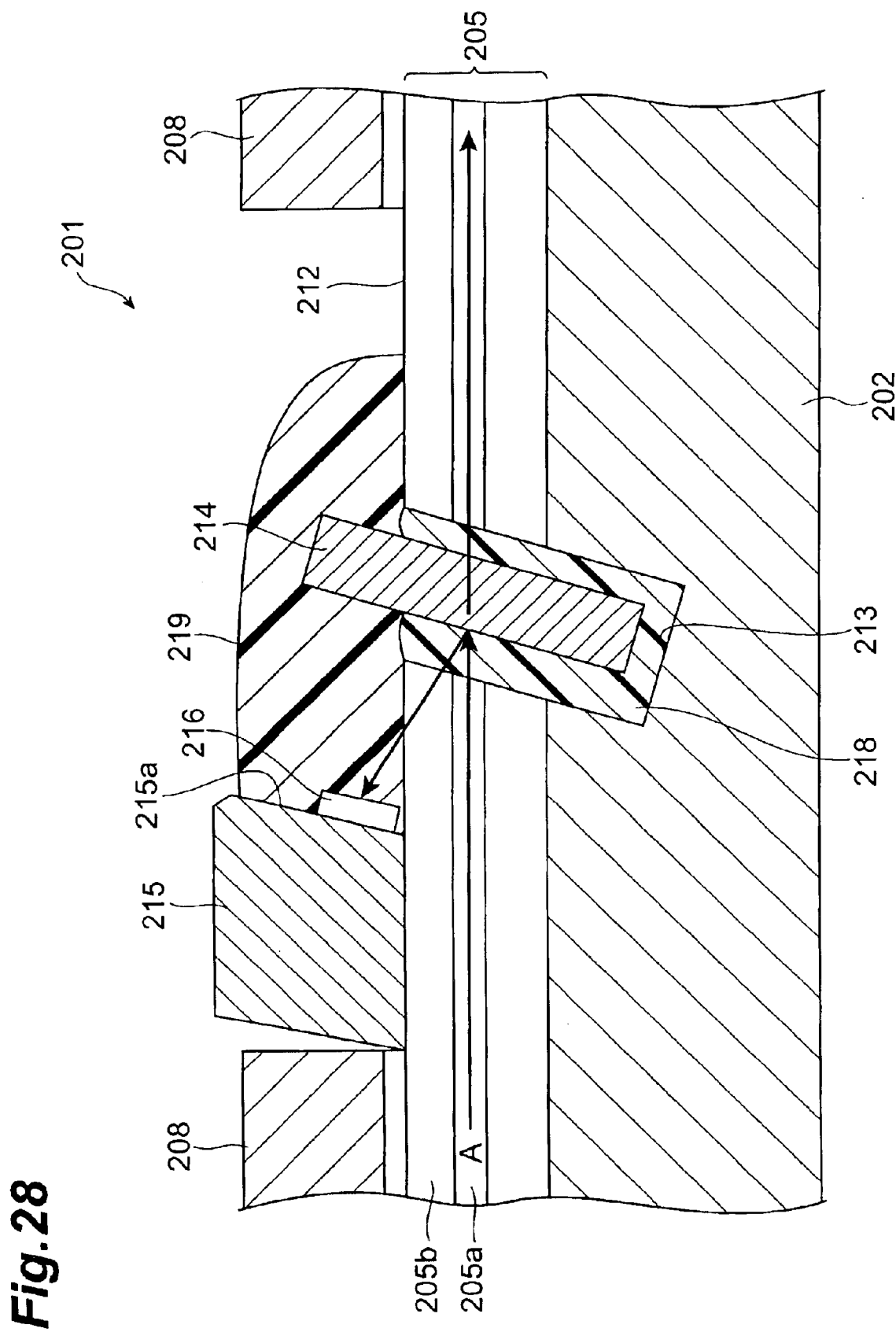
FIG. 28 is an enlarged sectional view of a location including the optical member and photodetector shown in FIG. 24.

As shown in FIG. 28, each bare fiber 205 comprises a core 205a and a cladding 205b. The bare fiber 205 secured onto the substrate 202 includes a cladding-shaved part 212 in which the upper side part of the cladding 205b is shaved flat toward the central axis of the bare fiber 205 between the lids 208.

A transverse groove 213 extending in a direction in which the bare fibers 205 are arranged is formed at the location between the lids 208 in the substrate 202. The transverse groove 213 is formed obliquely with respect to the axis of the bare fibers 205 so as to divide the cladding-shaved part 212 of each bare fiber 205. Inserted in the transverse groove 213 is an optical member 214 by which a part of signal light transmitted through the core 205a of each bare fiber 205 is reflected obliquely thereabove at a predetermined reflectance. The optical member 214 is arranged obliquely with respect to the axis of the bare fibers 205 (the upper face of the substrate 202) in conformity to the transverse groove 213.

At the location where the cladding-shaved part 212 of each bare fiber 205 is formed on the upper side of the substrate 202, a support member 215 is disposed so as to extend in the direction in which the bare fibers 205 are arranged. A surface (support surface) 215a opposing the reflecting surface of the optical member 214 in the support member 215 is tilted with respect to the upper face of the substrate 202. Photodetectors 216 for receiving light reflected by the optical member 214 and converting thus received light into an electric signal are secured to the support surface 215a. The number of photodetectors 216 is the same as that of bare fibers 205.

Though each photodetector 216 is disposed above its corresponding bare fiber 205, the upper cladding part of each bare fiber 205 is shaved as mentioned above, whereby the distance between the light-reflecting point of optical member 214 and the photodetector 216 is shortened accordingly as compared with the case where the upper cladding part of the bare fiber 205 is not shaved. This can effectively suppress the crosstalk between adjacent photodetectors 216.

The photodetectors 216 are electrically connected to a plurality of lead frames 217, for example, by way of a plurality of wiring patterns arranged on the upper face of the support member 215 and wires (not depicted). The lead frames 217 extend laterally of the substrate 202 on both sides. Though the lead frames 217 extend straight in each drawing, they are bent perpendicular to the upper face of the substrate 202 in a final product.

The transverse groove 213 is filled with a refractive index matching resin 218 for yielding a refractive index conforming to the cores 205a of the bare fibers 205. By curing the refractive index matching resin 218, the optical member 214 is secured to the substrate 202. On the upper side of the substrate 202 including the location between the optical member 214 and the support member 215, a refractive index matching resin 219 exhibiting a refractive index on a par with that of the refractive index matching resin 218 is provided so as to cover the optical member 214. As a consequence, no surface of discontinuity occurs in terms of refractive index between each bare fiber 205 and the optical member 214 and between the optical member 214 and each photodetector 216, whereby inconveniences such as reflection and scattering of light are prevented from occurring. Here, silicone resins and the like are used as the refractive index matching resins.

A resin having a low viscosity is used as the refractive index matching resin 218 here, since it is necessary for the resin to fully flow into the narrow gap between side faces of the transverse groove 213 and the optical member 214. Specifically, the resin preferably has a viscosity of 50 Pa·s or less at room temperature (15° C. to 35° C.), more preferably 20 Pa·s or less at room temperature. Preferably, a resin having a thixotropy with a high viscosity is used as the refractive index matching resin 219, so as to stay and hardly flow between the optical member 214 and each photodetector 216 after being applied. Specifically, a resin having a thixotropy of 1.1 or higher at room temperature is preferable in particular.

In thus configured optical device 201, signal light transmitted through the core part 205a of each bare fiber in the direction of A in FIG. 28 is transmitted through the refractive index matching resin 218 and optical member 214 within the transverse groove 213 so as to be further made incident on the core part 205a of the bare fiber and transmitted therethrough. Here, a part of the signal light is reflected by the optical member 214 toward the obliquely upper side of the upper face of the substrate 202. Thus reflected light reaches its corresponding photodetector 216 by way of the refractive index matching resin 219, and this photodetector 216 detects the optical intensity of the reflected light. The optical intensity is converted into an electric signal, and this electric signal is sent to an external device (not depicted) by way of its corresponding wiring pattern, wire (not depicted), and lead frame 217.

The optical device 201 also includes a sealing part 220 in which the location including the photodetectors 216 is sealed with a resin. The sealing part 220 is formed such that a resin surrounds the substrate 202 and the lids 208 while incorporating the photodetectors 216, optical member 214, and refractive index matching resins 218, 219. The coated optical fiber tape 203 extends in a state exposed from the sealing part 220 on both sides of the substrate 202. As the resin, a silicone resin or the like is used here.

Preferably, from the viewpoint of mass productivity, the sealing part 220 is formed by die molding (e.g., transfer molding). Therefore, the sealing part 220 is formed such that the side faces and lower face of the substrate 202 and the side faces and upper face of the lids 208 are covered with the resin except for both end parts of the substrate 202 and the outer end parts of the lids 208, which are parts coming into contact with the die.

Since the coating 204 and bare fibers 205 of the coated optical fiber tape 203 are covered with the lids 208, the coating 204 with a low heat resistance does not directly receive the heat of the die at a high temperature when forming the sealing part 220 by die molding, and no excessive force is exerted on each bare fiber 205. Therefore, the sealing part 220 can easily be formed without damaging the coated optical fiber tape 203. Also, as mentioned above, both side faces of the substrate 202 and both side faces of the lids 208 are made flush with each other by shaving after the lids 208 are assembled to the substrate 202, whereby resins can be prevented from leaking because of errors in assembly between the substrate 202 and the lids 208 when forming the sealing part 220 by die molding.

Such a sealing part 220 sufficiently protects the photodetectors 216 against the external environment. Therefore, the photodetectors 216 hardly deteriorate their optical characteristics because of humidity. Though moisture may enter the resin in such a resin sealing structure, the sealing part 220 is constructed so as to surround the substrate 202 and lids 208, whereby the distance from the outer face of the sealing part 220 to each photodetector 216 becomes longer accordingly. Hence, the flow of moisture in the resin stops before reaching the photodetector 216. As a consequence, there hardly occur cases where the photodetectors 216 deteriorate their characteristics because of moisture and the like attaching thereto. Therefore, a long-term operation stability is secured for the photodetectors 216, whereby the optical intensity of reflected light at the optical member 214 can be monitored accurately. Hence, the optical device improves its reliability.

Not only such photodetectors 216 but also the substrate 202, lids 208, optical member 214, a part of lead frames 217 extending from both sides of the substrate 202, wires for electric connection (not depicted), and the like are covered with the sealing part 220 so as to be protected against the external environment. Therefore, this configuration is advantageous in terms of reliability, stability, and strength.

In general, it is preferred that the sealing part 220 be formed so as to surround the substrate while incorporating the photodetectors. In this case, not only the photodetectors but also the substrate, the bare fibers and optical member secured onto the substrate, and the like are protected against the external environment. As a consequence, the optical device further improves its reliability.

Further, the resin sealing structure is less expensive than a hermetic seal formed by solder, for example.

Preferably, the coated optical fiber extends in a state exposed from the sealing part at least on one side of the substrate. This makes it unnecessary to position and secure the coated optical fiber to an optical connector or the like at least on one side of the substrate, whereby the sealing structure for the photodetectors and the like is simplified, whereas the photodetectors and the like can be sealed easily.

The optical device in accordance with an eleventh embodiment of the present invention will be explained with reference to FIGS. 29 and 30. In these drawings, members identical or equivalent to those in the tenth embodiment will be referred to with numerals identical thereto without repeating their explanations.

Figure 29:
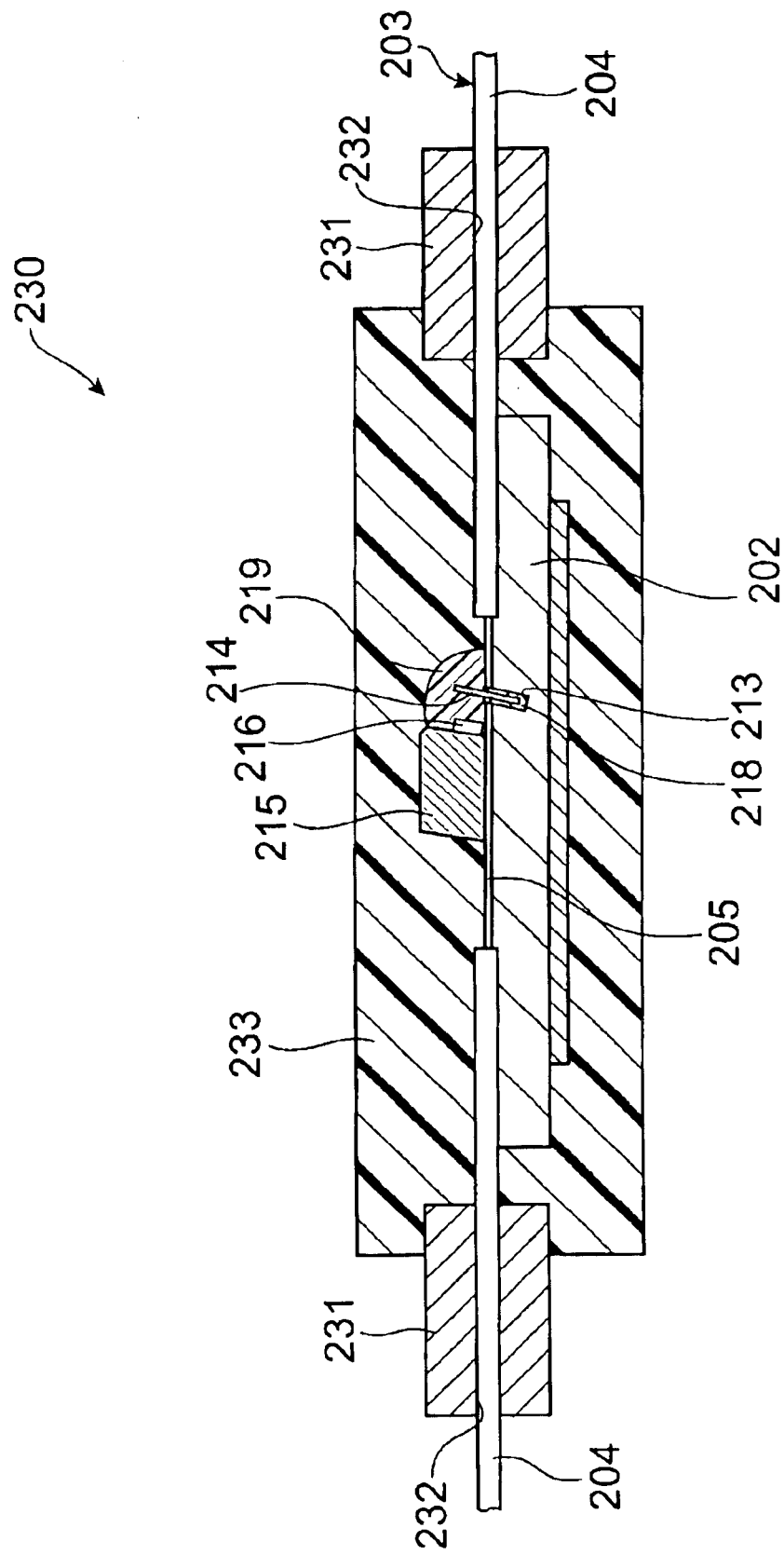
FIG. 29 is a vertical sectional view showing the optical device in accordance with an eleventh embodiment.
Figure 30:
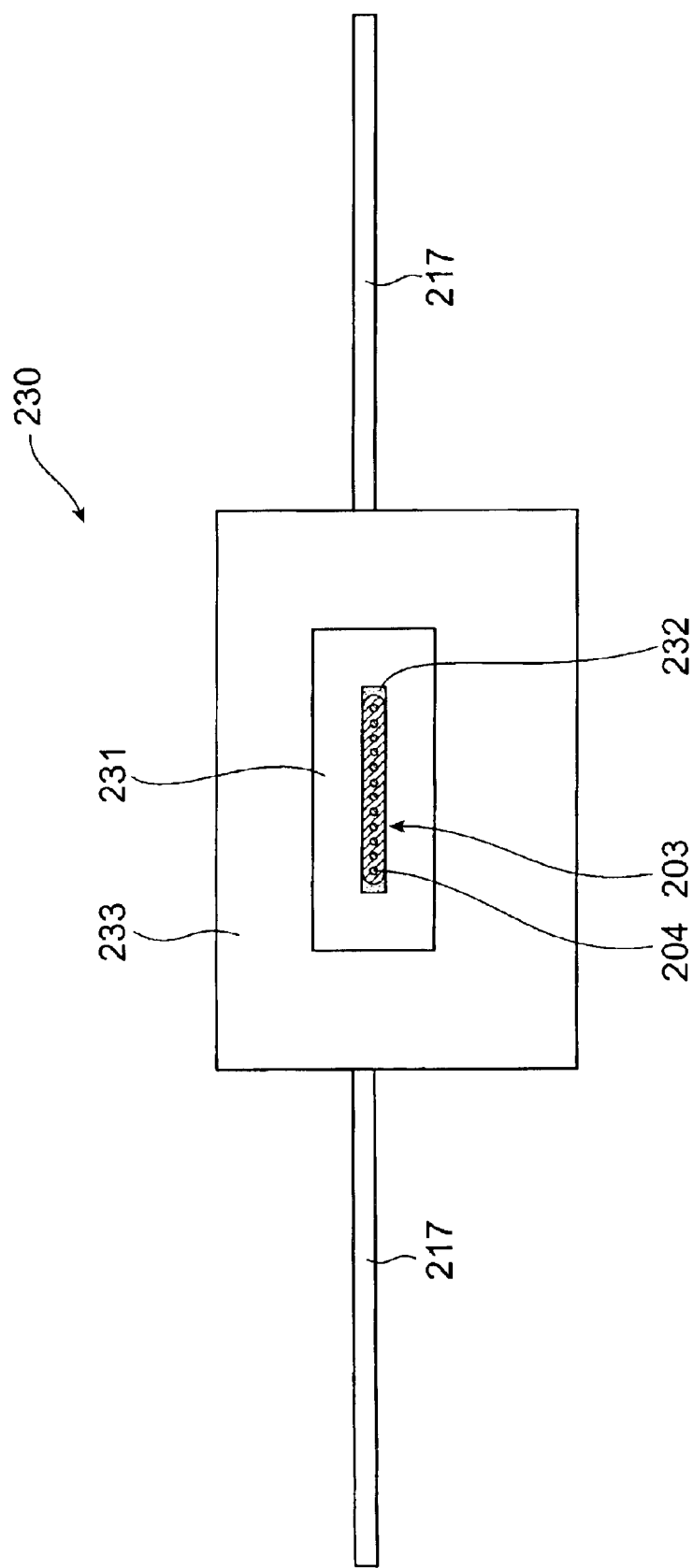
FIG. 30 is a front view of the optical device shown in FIG. 29.

FIG. 29 is a vertical sectional view of the optical device in accordance with the eleventh embodiment, whereas FIG. 30 is a front view of the optical device. In these drawings, the optical device 230 comprises two auxiliary members 231 disposed on both sides of a substrate 202. Each auxiliary member 231 has a through hole 232, through which a coated optical fiber tape 203 penetrates. In this state, the gap between the auxiliary members 231 and the coated optical fiber tape 203 is filled with an adhesive, a bonding resin, or the like, whereby the coated optical fiber tape 203 is held and secured by the auxiliary members 231. Since the coated optical fiber tape 203 is protected by the auxiliary members 231 as such, it is not always necessary to provide the lids 208 in the tenth embodiment.

The optical device 230 also comprises a sealing part 233, which is formed such that a resin surrounds the substrate 202 and the auxiliary members 231 while incorporating photodetectors 216, an optical member 214, and refractive index matching resins 218, 219. Specifically, the sealing part 233 covers the whole substrate 202 and both side faces and upper and lower faces of the auxiliary members 231 except for a part of the auxiliary members 231 with which the die comes into contact.

Since the auxiliary members 231 for holding the coated optical fiber tape 203 while in a state penetrated therethrough are provided in this embodiment as in the foregoing, the sealing part 233 can easily be formed by die molding as in the tenth embodiment. This can also eliminate the machining for surface alignment necessary when the lids 208 are disposed on the upper side of the substrate 202.

In general, it is preferred that an auxiliary member for holding a coated optical fiber in a state penetrated therethrough be disposed at least on one side of the substrate, and that a sealing part be formed so as to surround the substrate and auxiliary member while incorporating photodetectors. In this case, not only the photodetectors but also the substrate, the bare fibers and optical member secured onto the substrate, and the like can be protected against the external environment. When forming a sealing part by die molding, for example, the auxiliary member protects the coated optical fiber against heat and the like, whereby the sealing part can easily be formed without damaging the coated optical fiber.

The optical device in accordance with a twelfth embodiment of the present invention will be explained with reference to FIGS. 31 and 32. In these drawings, members identical or equivalent to those in the tenth and eleventh embodiments will be referred to with numerals identical thereto without repeating their explanations.

Figure 31:
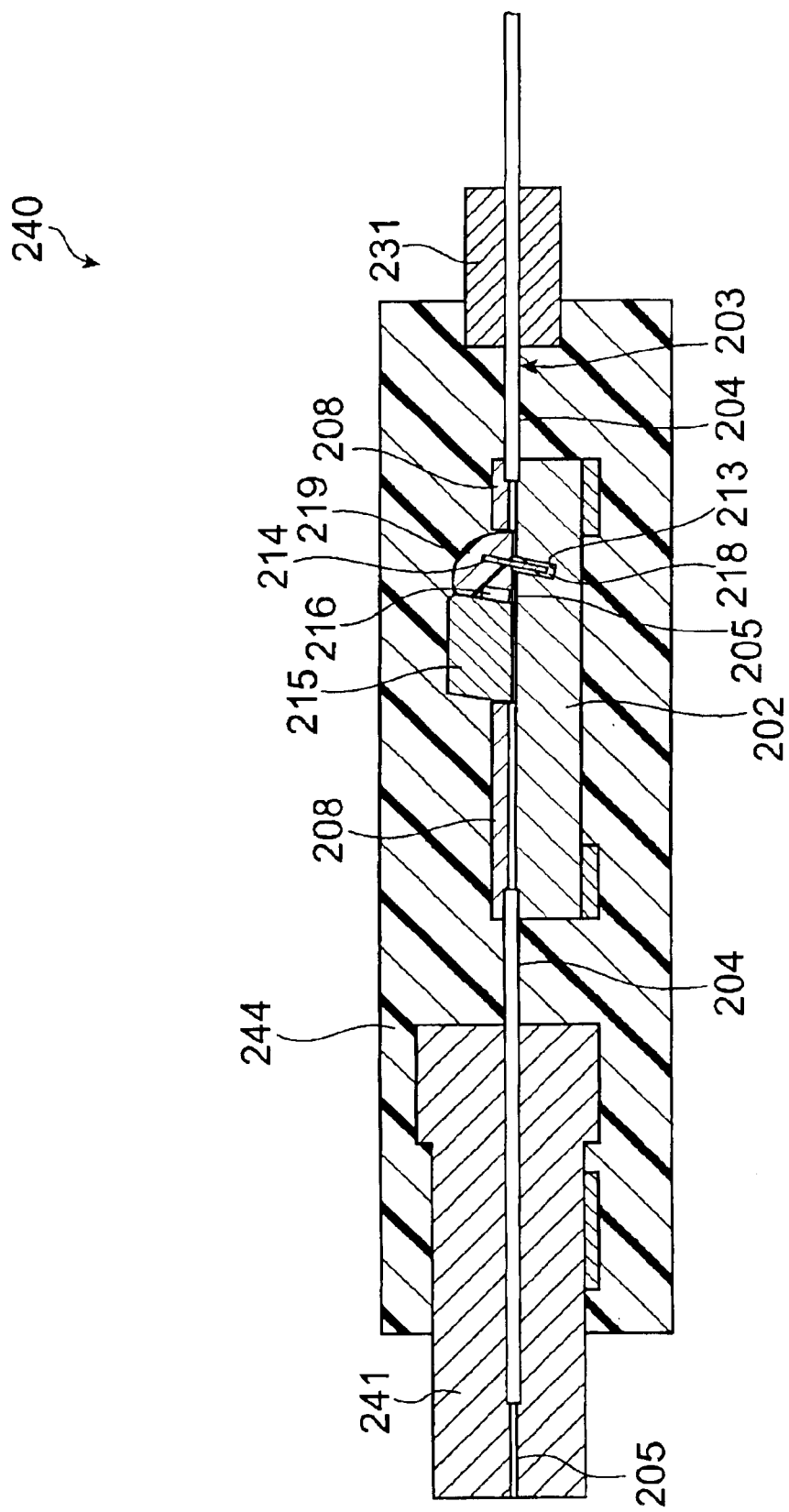
FIG. 31 is a vertical sectional view showing the optical device in accordance with a twelfth embodiment.

FIG. 31 is a vertical sectional view of the optical device in accordance with the twelfth embodiment. In this drawing, the optical device 240 comprises an auxiliary member 231 disposed on one side of a substrate 202, and an MT connector ferrule (connecting member) 241 disposed on the other side of the substrate 202.

Figure 32:
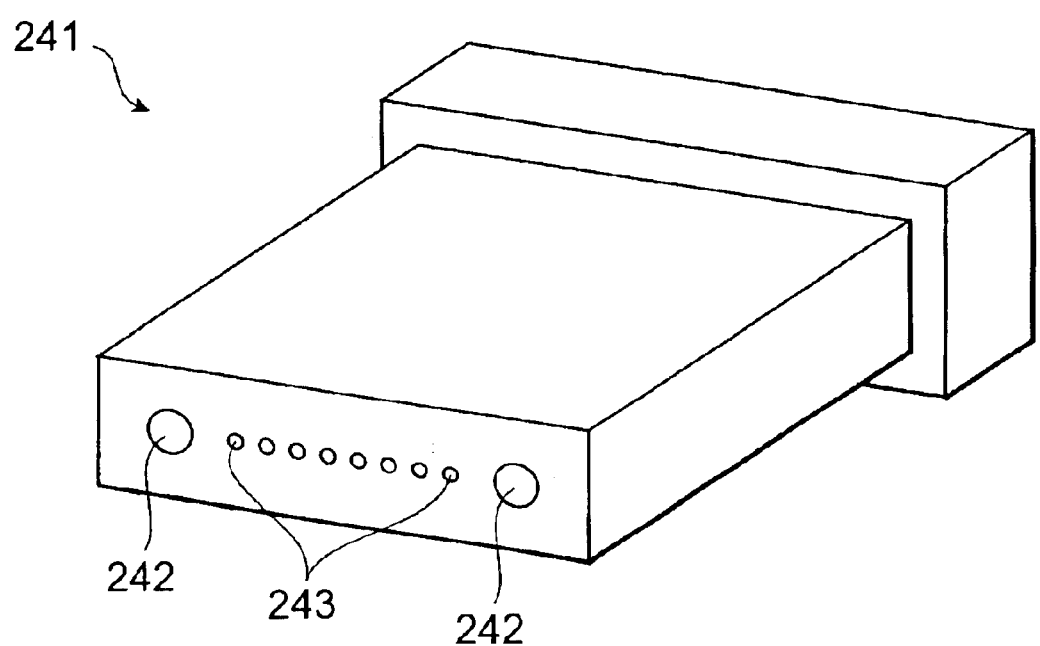
FIG. 32 is a perspective view of the connector ferrule shown in FIG. 31.

As shown in FIG. 32, the MT connector ferrule 241 has a pair of guide holes 242 in which guide pins (not depicted) are inserted upon connection, and a plurality of fiber holes 243 in which bare fibers 205 exposed from a coated optical fiber tape 203 by removing a coating 204 from one end part thereof are inserted in an aligned state.

Such an MT connector ferrule 241 is arranged such that its front end face is oriented to the outside of the substrate 202. The bare fibers 205 at one end part of the coated optical fiber tape 203 are inserted into the respective fiber holes 243 from the rear end face side of the MT connector ferrule 241, and are secured to the MT connector ferrule 241 with an adhesive or the like.

The optical device 240 also comprises a sealing part 244, which is formed such that a resin surrounds the substrate 202, lids 208, auxiliary member 231, and connector ferrule 241 while incorporating photodetectors 216, an optical member 214, and refractive index matching resins 218, 219. Specifically, the sealing part 244 covers the substrate 202 and lids 208 as a whole and both side faces and upper and lower faces of the auxiliary member 231 and connector ferrule 241 except for a part of the auxiliary member 231 and connector ferrule 241 with which the die comes into contact. As a result, the coated optical fiber tape 203 extends in a state exposed from the sealing part 244 on one side of the substrate 202.

Since the MT connector ferrule 241 holding an end part of the coated optical fiber tape 203 in an aligned state is provided as in the foregoing in this embodiment, the coated optical fiber tape 203 can easily be connected to another optical fiber member by way of the connector ferrule 241. As a consequence, the optical device improves its handling.

The optical device in accordance with a thirteenth embodiment of the present invention will be explained with reference to FIG. 33. In this drawing, members identical or equivalent to those in the tenth and eleventh embodiments will be referred to with numerals identical thereto without repeating their explanations.

Figure 33:
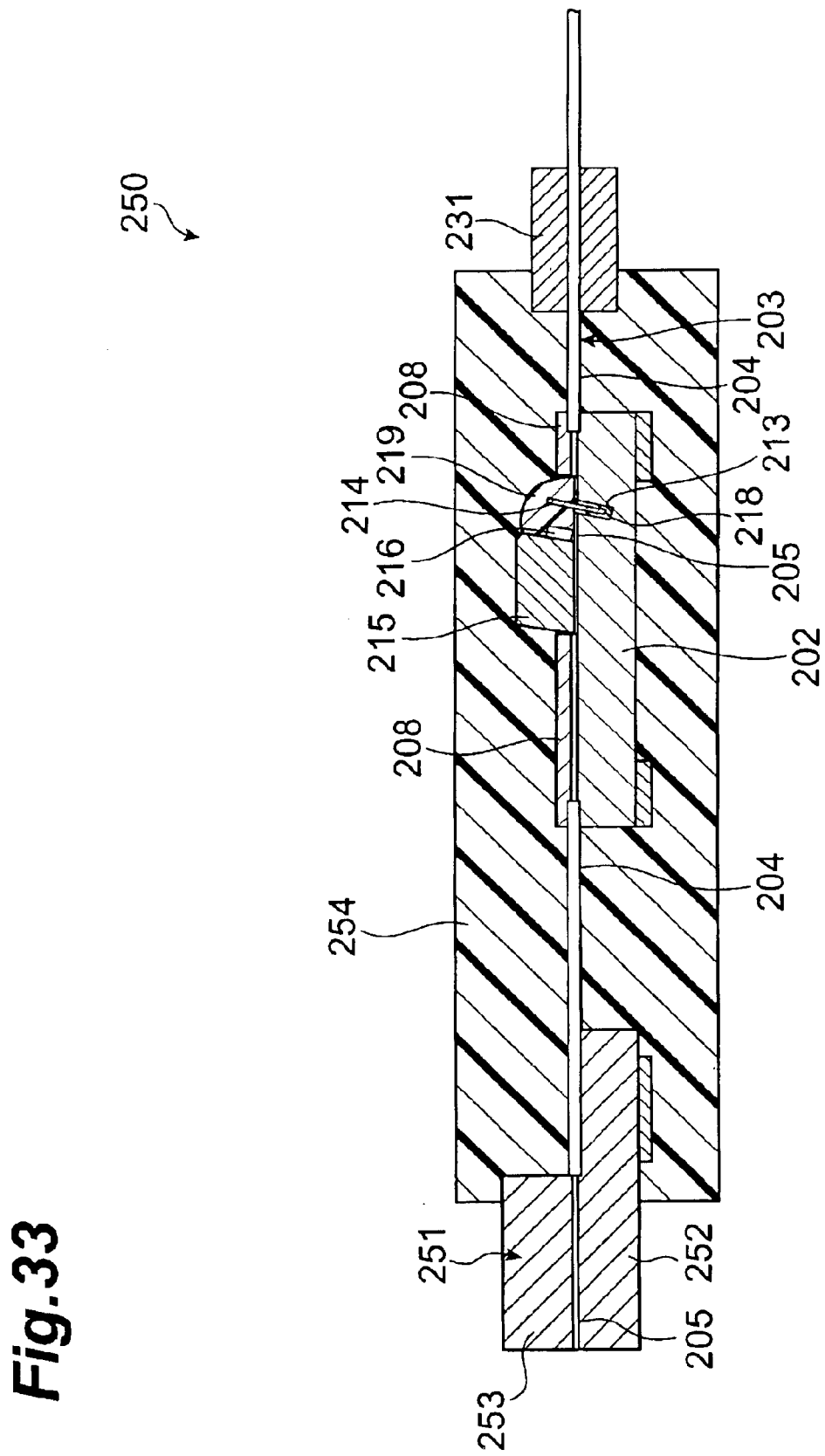
FIG. 33 is a vertical sectional view showing the optical device in accordance with a thirteenth embodiment.

In FIG. 33, the optical device 250 in accordance with the thirteenth embodiment comprises a fiber array 251 in place of the MT connector ferrule 241 in the twelfth embodiment. This fiber array 251 holds bare fibers 205 exposed from a coated optical fiber tape 203 by removing its coating 204 from one end part thereof. The fiber array 251 comprises a base 252 having an upper face provided with a plurality of V grooves (not depicted), and a lid 253 covering a plurality of bare fibers 205 arranged in the respective V grooves of the base 252. Such a fiber array 251 facilitates connection between the coated optical fiber tape 203 and PLC components.

In general, it is preferred that a connecting member for holding an end part of a coated optical fiber be disposed on one side of a substrate, and that a sealing part be formed so as to surround the substrate and connecting member while incorporating photodetectors. In this case, not only the photodetectors but also the substrate, the bare fibers and optical member secured onto the substrate, and the like can be protected against the external environment. Also, the connecting member makes it easier to connect the optical device to other optical fiber components, whereby the optical device improves its handling.

The optical device 250 also comprises a sealing part 254, which is formed such that a resin surrounds the substrate 202, lids 208, auxiliary member 231, and fiber array 251 while incorporating photodetectors 216, an optical member 214, and refractive index matching resins 218, 219.

The foregoing embodiments are configured such that a sealing part is formed while the lids 208 are disposed on the upper side of the substrate 202 or the auxiliary member 231, MT connector ferrule 241, or fiber array 251 is arranged beside the substrate 202. However, without the intervention of such a member, a sealing part for directly holding the coated optical fiber tape 203 may be formed so that the coated optical fiber tape 203 extends in a state directly exposed from the sealing part. In this case, in order to protect the coating 204 of the coated optical fiber tape 203 having a low heat resistance, it is preferred that the coating 204 be coated with a resin exhibiting a heat resistance higher than that of the coating 204, for example.

Though the foregoing embodiments form such a sealing part that a resin covers the substrate 202 while incorporating the photodetectors 216, optical member 214, and refractive index matching resins 218, 219, any sealing part can be used without being restricted thereto in particular as long as it can seal at least the photodetectors 216 with a resin.

Though the foregoing embodiments use the optical member 214 reflecting a part of signal light transmitted through the core parts 205a of bare fibers, optical members diffracting a part of signal light transmitted through the core parts 205a of bare fibers can also be used.

Though the foregoing embodiments monitor the optical intensity of optical signals transmitted through the core parts 205a of bare fibers in the multicore coated optical fiber tape 203 and the like, the present invention is also applicable to an optical device in which a single-core coated optical fiber is secured to the upper face part of the substrate 202.

Figure 34:
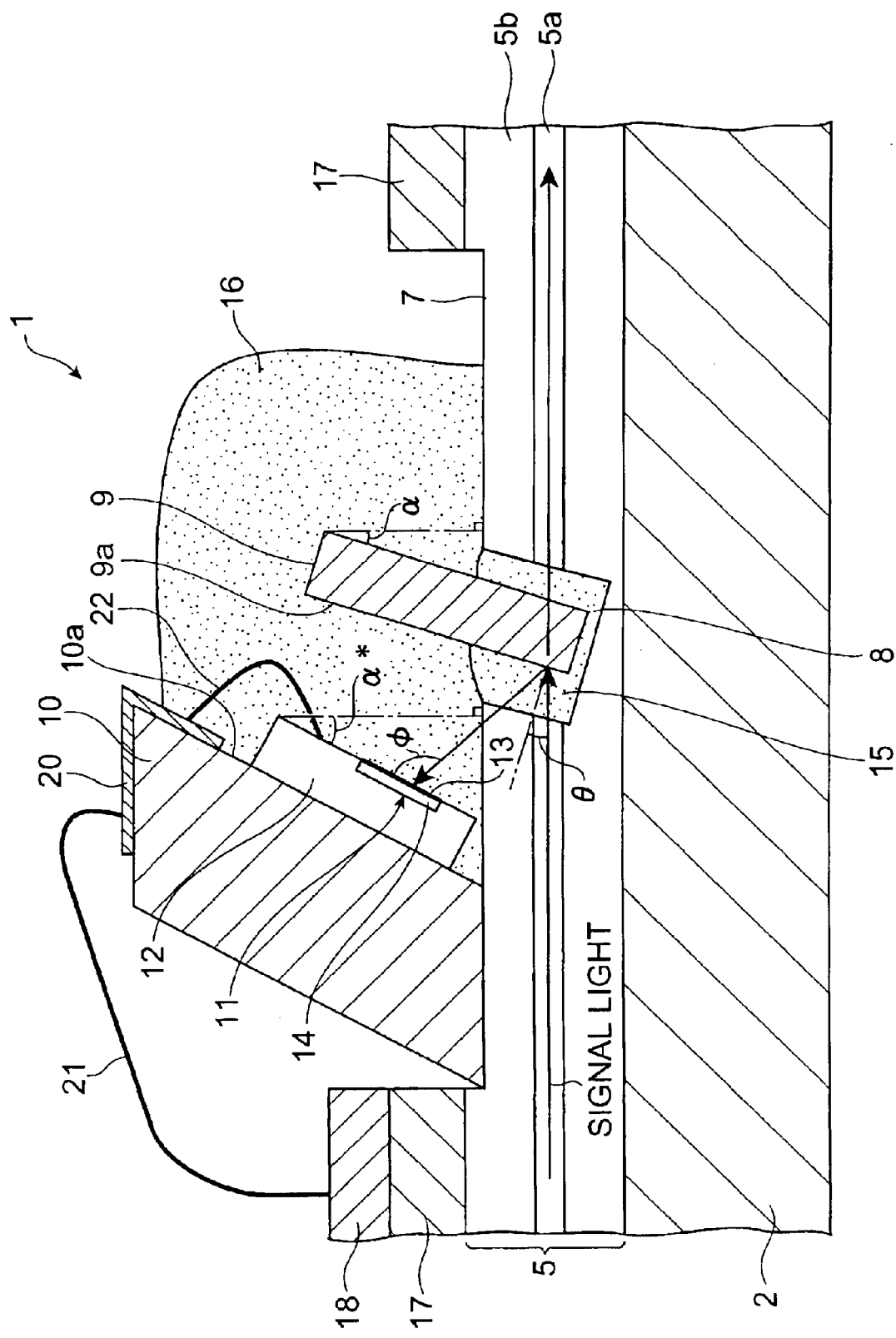
FIG. 34 is a vertical sectional view of a modified example of the optical device shown in FIG. 2.

Though the foregoing embodiments form a transverse groove so as to divide bare fibers secured onto a substrate, other configurations may also be employed. FIG. 34 is a vertical sectional view of a modified example of the optical device shown in FIG. 2. As shown in FIG. 34, the transverse groove 8 for placing the optical member 9 may be formed so as to traverse at least the core parts 5a of the bare fibers 5 without reaching the substrate 2 thereunder. The same holds for the optical devices shown in the drawings other than FIG. 2.

The optical device in accordance with the present invention is utilizable as an optical device which can accurately monitor the optical intensity of optical signals. Namely, since a photodetector is disposed such that its light entrance surface is tilted with respect to the upper face of a substrate arranged in parallel with an optical waveguide, the present invention can lower the polarization dependence of received light in the photodetector. As a consequence, the optical intensity of optical signals transmitted through the coated optical fiber can be monitored accurately.

Also, since optical path changing means is provided for changing an optical path such that the light reflected or diffracted by the optical member is incident on the light entrance surface of the photodetector at a predetermined angle, the present invention can lower the polarization dependence of received light in the photodetector. As a consequence, the optical intensity of optical signals transmitted through the coated optical fiber can be monitored accurately.

In the configuration in which a package is secured to the coated optical fiber so as to seal the photodetector hermetically, the photodetector can be prevented from deteriorating its characteristics because of humidity and the like. This stabilizes operations of the photodetector, whereby the optical device improves its reliability.

The configuration provided with a sealing part sealing at least the photodetector with a resin can prevent the photodetector from deteriorating its characteristics because of humidity and the like. This stabilizes operations of the photodetector, whereby the optical device improves its reliability.

What is claimed is:

1. An optical device comprising:
   a substrate having a bare fiber positioned and secured to an upper face part of the substrate, the bare fiber being exposed from a coated optical fiber partly stripped of a coating;

a transverse groove formed obliquely with respect to an axis of the bare fiber so as to traverse at least a core part of the bare fiber;

an optical member, inserted into the transverse groove, for reflecting or diffracting a part of signal light transmitted through the coated optical fiber; and a photodetector, disposed on an upper side of the substrate, for detecting the light reflected or diffracted by the optical member;

the photodetector being arranged with a light entrance surface thereof tilting with respect to the upper face of the substrate.

2. An optical device according to claim 1, wherein a support member supporting the photodetector is disposed on the upper side of the substrate; and wherein the support member has a support surface tilted with respect to the upper face of the substrate.

3. An optical device according to claim 2, wherein a member having a tilted surface inclined with respect to the upper face of the substrate is provided on the upper side of the substrate; and wherein the support member has a rectangular parallel-epiped or cubic form and is mounted on the tilted surface.

4. An optical device according to claim 1, wherein the bare fiber secured to the upper face part of the substrate has a cladding-shaved part having shaved a cladding part.

5. An optical device according to claim 4, wherein a lid covering the bare fiber is disposed on the upper side of the substrate so as to exclude the cladding-shaved part.

6. An optical device according to claim 4, wherein the cladding-shaved part is provided only on the photodetector side of the optical member.

7. An optical device according to claim 1, wherein a light-receiving part of the photodetector is disposed on a surface opposite from the upper face of the substrate.

8. An optical device according to claim 1, wherein a light-receiving part of the photodetector has a substantially circular or substantially elliptical form including an elliptical light spot formed by being reflected or diffracted by the optical member.

9. An optical device according to claim 1, wherein a light-guiding member for guiding light reflected or diffracted by the optical member to the photodetector is disposed between the optical member and the photodetector.

10. An optical device according to claim 1, wherein the photodetector is disposed such that light reflected or diffracted by the optical member forms an angle of incidence of 70 to 110 degrees with the light entrance surface.

11. An optical device comprising:

a substrate having a bare fiber positioned and secured to an upper face part of the substrate, the bare fiber being exposed from a coated optical fiber partly stripped of a coating;

a transverse groove formed obliquely with respect to an axis of the bare fiber so as to traverse at least a core part of the bare fiber;

an optical member, inserted into the transverse groove, for reflecting or diffracting a part of signal light transmitted through the coated optical fiber;

a photodetector, disposed on an upper side of the substrate, for detecting the light reflected or diffracted by the optical member; and optical path changing means for changing an optical path such that the light reflected or diffracted by the optical member is incident on a light entrance surface of the photodetector at a predetermined angle.

12. An optical device according to claim 11, wherein the optical path changing means is a total reflection mirror.

13. An optical device according to claim 1, further comprising a package secured to the coated optical fiber so as to seal the photodetector hermetically.

14. An optical device according to claim 13, wherein a plurality of coated optical fibers are stripped of a coating at a terminal part so as to expose bare fibers, the bare fibers are connected to each other while being opposed to each other, and thus connected bare fibers are positioned and secured to the upper face part of the substrate.

15. An optical device according to claim 13, wherein the transverse groove is filled with a first refractive index matching resin for yielding a refractive index matching the core part of the bare fiber; and wherein a second refractive index matching resin having a refractive index on a par with the refractive index of the first refractive index matching resin is provided between the optical member and the photodetector.

16. An optical device according to claim 15, wherein the second refractive index matching resin has a viscosity higher than that of the first refractive index matching resin.

17. An optical device according to claim 16, wherein the viscosity of the first refractive index matching resin is not greater than 50 Pa·s at room temperature.

18. An optical device according to claim 16, wherein the second refractive index matching resin is a resin having a thixotropy.

19. An optical device according to claim 13, wherein the bare fiber has a surface plated with a metal; and wherein the package is formed from a metal or a material having a surface plated with a metal and is secured to the bare fiber with solder so as to seal the photodetector hermetically.

20. An optical device according to claim 19, wherein the coating of the coated optical fiber and the package are secured to each other with a resin.

21. An optical device according to claim 13, wherein the package is formed from a material having a thermal expansion coefficient on a par with that of the bare fiber.

22. An optical device according to claim 13, wherein the coated optical fiber is secured to an auxiliary attachment with a resin or solder; and wherein the auxiliary attachment is secured to the package with a resin or solder.

23. An optical device according to claim 1, further comprising a sealing part sealing at least the photodetector with a resin.

24. An optical device according to claim 23, wherein the sealing part is formed so as to surround the substrate while incorporating the photodetector.

25. An optical device according to claim 24, wherein the coated optical fiber extends in a state exposed from the sealing part on at least one side of the substrate.

26. An optical device according to claim 25, wherein lids for protecting the coated optical fiber are disposed on both end sides of the substrate so as to hold the optical member and photodetector therebetween; and wherein the sealing part is formed so as to surround the substrate and lids while incorporating the photodetector.

27. An optical device according to claim 26, wherein, after the lids are assembled to the substrate, a side face of the substrate and a side face of the lids are machined so as to be flush with each other.

28. An optical device according to claim 25, wherein an auxiliary member for holding the coated optical fiber so that the coated optical fiber penetrates therethrough is disposed on at least one side of the substrate; and wherein the sealing part is formed so as to surround the substrate and auxiliary member while incorporating the photodetector.

29. An optical device according to claim 25, wherein a connecting member for holding an end part of the coated optical fiber is disposed on one side of the substrate; and wherein the sealing part is formed so as to surround the substrate and connecting member while incorporating the photodetector.

30. An optical device according to claim 29, wherein the connecting member is a connector ferrule.

31. An optical device according to claim 29, wherein the connecting member is a fiber array.

32. An optical device according to claim 24, wherein the transverse groove is filled with a first refractive index matching resin for yielding a refractive index matching the core part of the bare fiber, whereas a second refractive index matching resin having a refractive index on a par with the refractive index of the first refractive index matching resin is provided between the optical member and the photodetector; and wherein the sealing part is formed so as to surround the substrate while incorporating the photodetector, optical member, first refractive index matching resin, and second refractive index matching resin.

33. An optical device according to claim 11, further comprising a package secured to the coated optical fiber so as to seal the photodetector hermetically.

34. An optical device according to claim 33, wherein a plurality of coated optical fibers are stripped of a coating at a terminal part so as to expose bare fibers, the bare fibers are connected to each other while being opposed to each other, and thus connected bare fibers are positioned and secured to the upper face part of the substrate.

35. An optical device according to claim 33, wherein the transverse groove is filled with a first refractive index matching resin for yielding a refractive index matching the core part of the bare fiber; and wherein a second refractive index matching resin having a refractive index on a par with the refractive index of the first refractive index matching resin is provided between the optical member and the photodetector.

36. An optical device according to claim 35, wherein the second refractive index matching resin has a viscosity higher than that of the first refractive index matching resin.

37. An optical device according to claim 36, wherein the viscosity of the first refractive index matching resin is not greater than 50 Pa·s at room temperature.

38. An optical device according to claim 36, wherein the second refractive index matching resin is a resin having a thixotropy.

39. An optical device according to claim 33, wherein the bare fiber has a surface plated with a metal; and wherein the package is formed from a metal or a material having a surface plated with a metal and is secured to the bare fiber with solder so as to seal the photodetector hermetically.

40. An optical device according to claim 39, wherein the coating of the coated optical fiber and the package are secured to each other with a resin.

41. An optical device according to claim 33, wherein the package is formed from a material having a thermal expansion coefficient on a par with that of the bare fiber.

42. An optical device according to claim 33, wherein the coated optical fiber is secured to an auxiliary attachment with a resin or solder; and wherein the auxiliary attachment is secured to the package with a resin or solder.

43. An optical device according to claim 11, further comprising a sealing part sealing at least the photodetector with a resin.

44. An optical device according to claim 43, wherein the sealing part is formed so as to surround the substrate while incorporating the photodetector.

45. An optical device according to claim 44, wherein the coated optical fiber extends in a state exposed from the sealing part on at least one side of the substrate.

46. An optical device according to claim 45, wherein lids for protecting the coated optical fiber are disposed on both end sides of the substrate so as to hold the optical member and photodetector therebetween; and wherein the sealing part is formed so as to surround the substrate and lids while incorporating the photodetector.

47. An optical device according to claim 46, wherein, after the lids are assembled to the substrate, a side face of the substrate and a side face of the lids are machined so as to be flush with each other.

48. An optical device according to claim 45, wherein an auxiliary member for holding the coated optical fiber so that the coated optical fiber penetrates therethrough is disposed on at least one side of the substrate; and wherein the sealing part is formed so as to surround the substrate and auxiliary member while incorporating the photodetector.

49. An optical device according to claim 45, wherein a connecting member for holding an end part of the coated optical fiber is disposed on one side of the substrate; and wherein the sealing part is formed so as to surround the substrate and connecting member while incorporating the photodetector.

50. An optical device according to claim 49, wherein the connecting member is a connector ferrule.

51. An optical device according to claim 49, wherein the connecting member is a fiber array.

52. An optical device according to claim 44, wherein the transverse groove is filled with a first refractive index matching resin for yielding a refractive index matching the core part of the bare fiber, whereas a second refractive index matching resin having a refractive index on a par with the refractive index of the first refractive index matching resin is provided between the optical member and the photodetector; and wherein the sealing part is formed so as to surround the substrate while incorporating the photodetector, optical member, first refractive index matching resin, and second refractive index matching resin.

53. An optical submarine cable comprising the optical device according to claim 13, the optical device having a reliability of 1 failure in time (Fit) or less in terms of failure in time as a hermetic sealing characteristic.

54. An optical submarine cable comprising the optical device according to claim 33, the optical device having a reliability of 1 failure in time (Fit) or less in terms of failure in time as a hermetic sealing characteristic.

* * * * *